(12) United States Patent
Fessler et al.

(10) Patent No.: US 12,530,927 B2
(45) Date of Patent: Jan. 20, 2026

(54) CHANNEL ELEMENT FOR A FLOOR CABLE CHANNEL FOR A RACE TIMING SYSTEM

(71) Applicant: Race Result AG, Pfinztal (DE)

(72) Inventors: Manuel Fessler, Neuenbürg (DE); Nikias Klohr, Stutensee (DE); Martha Augsburger, Pfinztal (DE)

(73) Assignee: Race Result AG, Pfinztal (DE)

(*) Notice: Subject to any disclaimer, the term of this patent is extended or adjusted under 35 U.S.C. 154(b) by 0 days.

(21) Appl. No.: 19/102,104

(22) PCT Filed: Aug. 7, 2023

(86) PCT No.: PCT/EP2023/071843
§ 371 (c)(1),
(2) Date: Feb. 7, 2025

(87) PCT Pub. No.: WO2024/033316
PCT Pub. Date: Feb. 15, 2024

(65) Prior Publication Data
US 2025/0259481 A1 Aug. 14, 2025

(30) Foreign Application Priority Data
Aug. 8, 2022 (EP) .................................... 22189293

(51) Int. Cl.
*G07C 1/24* (2006.01)
*G06K 7/10* (2006.01)
(Continued)

(52) U.S. Cl.
CPC ........... *G07C 1/24* (2013.01); *G06K 7/10297* (2013.01); *G06K 19/0723* (2013.01); *H01Q 1/2216* (2013.01); *H01Q 1/42* (2013.01)

(58) Field of Classification Search
CPC .. G07C 1/24; G06K 7/10297; G06K 19/0723; H01Q 1/2216
(Continued)

(56) References Cited

U.S. PATENT DOCUMENTS 9,883,332 B2 * 1/2018 Hansen ................... G16H 40/63
10,537,783 B2 * 1/2020 Medina-Brodsky ..... A63K 3/00
(Continued)

FOREIGN PATENT DOCUMENTS

EP          2 921 988 A1      9/2015
WO     WO-2016/188798 A1    12/2016

OTHER PUBLICATIONS

Decision to Grant in EP 22189293.8 dated Dec. 5, 2024 (2 pages).
International Search Report and Written Opinion on PCT/EP2023/071843 dated Nov. 8, 2023 (13 pages).

*Primary Examiner* — Ahshik Kim
(74) *Attorney, Agent, or Firm* — Foley & Lardner LLP

(57) ABSTRACT

The present invention relates to a channel element (22) for a floor cable channel (20) for positioning an antenna (106) on an underlying surface and for protecting the antenna from external forces, comprising: a first connection portion (154) for connecting the channel element to a preceding channel element (108) and a second connection portion (156) for connecting the channel element to a following channel element (110); a center protection area (160) for receiving the antenna; a first protection area (162) for receiving a first cable (114), wherein the first protection area is designed to connect the center protection area to the first connection portion, and a second protection area (166) for receiving a second cable (118), wherein the second protection area is designed to connect the center protection area to the second connection portion; and a bypass protection area (170, 170a, 170b) for receiving a cable, wherein the bypass protection area is designed to connect the first connection portion to the (Continued)

second connection portion, wherein the first connection portion is designed to connect the first protection area to a bypass protection area of the preceding channel element and the bypass protection area to a first protection area of the preceding channel element; and/or the second connection portion is designed to connect the second protection area to a bypass protection area of the following channel element and the bypass protection area to a second protection area of the following channel element. The present invention further relates to a detection assembly (102), a floor cable channel (20) and a race timing system (16).

18 Claims, 12 Drawing Sheets

(51) Int. Cl.
  *G06K 19/07* (2006.01)
  *H01Q 1/22* (2006.01)
  *H01Q 1/42* (2006.01)
(58) Field of Classification Search
  USPC .......................................... 235/377
  See application file for complete search history.

(56) References Cited

U.S. PATENT DOCUMENTS

| | | | | |
|---|---|---|---|---|
| 2010/0265801 | A1* | 10/2010 | Ehelen | H01Q 1/40 368/9 |
| 2014/0052279 | A1* | 2/2014 | Van Rens | G07C 1/24 700/91 |
| 2021/0408660 | A1* | 12/2021 | Verwoerd | H01Q 1/2216 |

* cited by examiner

CHANNEL ELEMENT FOR A FLOOR CABLE CHANNEL FOR A RACE TIMING SYSTEM

CROSS-REFERENCE TO RELATED APPLICATIONS

This application is a U.S. national phase application under 35 U.S.C. § 371 of International Application No. PCT/EP2023/071843, filed Aug. 7, 2023, which claims the benefit of and priority to European Patent Application No. 22189293.8, filed Aug. 8, 2022, both of which are incorporated herein by reference in their entirety.

BACKGROUND

Field of the Invention

The present invention relates to a channel element for a floor cable channel for positioning an antenna on an underlying surface and for protecting the antenna from external forces. The present invention further relates to a detection assembly for detecting passing sports timing transponders in a sports event, a floor cable channel and a race timing.

In the field of timing at sports events, for example running events, marathons, bicycle races, skiing races, car races, horse races or others, timing of participants' start, finish, and split times plays an important role. In prevailing timing systems, oftentimes a person, a vehicle or an animal, whose time is to be measured, carries a radio element (sports timing transponder, in particular an active or passive RFID tag) for non-contact, automated timing. Runners, for instance, may carry radio elements that are attached to shoe laces or to a bib number for being pinned to the participant's shirt or pants.

At start, finish and split time positions along a track, measuring points are provided to detect the presence of the radio element and determine a passing time, i.e. a moment in time at which the radio element passes the measuring point. For this purpose, a measuring point usually comprises a corresponding antenna and data processing means to process the received data. Usually, the determined passing times for the participants are then communicated to a central evaluation point for access by the organizers of the event and the participants.

In this context, a sports timing transponder particularly designates a radio element that is able to transmit and receive radio signals. A sports timing transponder may refer to a passive RFID tag that has no integrated energy source or to an active RFID tag with an included battery. In the case of a passive RFID tag, the sports timing transponder is usually activated, i.e. read out, upon passing a measuring point, by a corresponding RFID reader that can determine the passing time based on one or multiple reads. In the case of an active RFID tag, usually an inductive loop is detected by the tag and a passing time is calculated in the tag based on multiple detections to be transmitted to a corresponding apparatus for further processing and/or evaluation.

Current sports timing systems for passive RFID tags usually include a suitcase-sized apparatus (usually referred to as decoder) comprising the RFID reader. This decoder is connected to a corresponding RFID antenna. The antenna is often a ground antenna that is integrated in a cable channel, or a side antenna that is positioned at a side of a race track on a tripod. Apart from the RFID reader, which is usually an RFID reader originally intended for logistics applications, current decoders include at least a battery, a processing module and different options for communication.

Description of the Related Art

In this context, WO 2016/188798 A1 relates to a floor cable channel for positioning a cable line element on an underlying surface and for protecting the cable line element. Two channel elements are configured for receiving the cable line element and for being connected by means of a connection element. The floor cable channel can be brought into a transport position and into an operating position in which the channel elements are arranged one behind the other along their longitudinal axes. There is further disclosed a floor antenna including the floor cable channel as well as an electrical conductor and an antenna. Still further, there is disclosed a timing system including a ground antenna, a mobile transponder and a mobile base station.

Relevant drawbacks of current solutions are oftentimes their limited flexibility with respect to the deployment at the location of the sports event as well as the complexity for setting up the race timing system. Usually, application scenarios require the sports timing system to be installed as quickly and as easily as possible. Oftentimes, the exact location of start, finish and split time positions, the circumstances at these locations and in particular the width of the race track at the location are not known beforehand. Furthermore, only limited time is avail-able for setting up the system. Still further, the personnel setting up the system oftentimes includes unskilled workers that have no or little specific experience. In view of this, a flexible and simple way to set up the race timing system is relevant.

SUMMARY OF THE INVENTION

In view of the above, the present invention addresses the problem of providing a flexible to use and easy to set up race timing system. In particular, the desired race timing system should allow for accommodating different widths of the race track, should limit the impact of errors or mistakes upon installation due to misuse or lack of experience of the set-up personnel and should be robust against environmental impacts from changing weather conditions or mechanical stress.

To solve this problem, a first aspect of the present invention relates to a channel element for a floor cable channel for positioning an antenna on an underlying surface and for protecting the antenna from external forces, comprising:
- a first connection portion for connecting the channel element to a preceding channel element and a second connection portion for connecting the channel element to a following channel element;
- a center protection area for receiving the antenna;
- a first protection area for receiving a first cable, wherein the first protection area is designed to connect the center protection area to the first connection portion, and a second protection area for receiving a second cable, wherein the second protection area is designed to connect the center protection area to the second connection portion; and
- a bypass protection area for receiving a cable, wherein the bypass protection area is designed to connect the first connection portion to the second connection portion, wherein
  the first connection portion is designed to connect the first protection area to a bypass protection area of the preceding channel element and the bypass protection area to a first protection area of the preceding channel element; and/or the second connection portion is designed to connect the second protection area to a bypass protection area of the following channel element and the bypass protection area to a second protection area of the following channel element.

In another aspect the present invention relates to a detection assembly for detecting passing sports timing transponders in a sports event, comprising:
- a channel element as described above, wherein the center protection area is configured to receive a calculation unit connected to the antenna; and
- an antenna and a calculation being positioned in the center protection area of the channel element, wherein
- said calculation unit is connectable to a first neighboring calculation unit in a pre-preceding channel element via a first cable positioned in the first protection area and in the bypass protection area of the preceding channel element; and
- said calculation unit is connectable to a second neighboring calculation unit in a post-following channel element via a second cable positioned in the second protection area and in the bypass protection area of the following channel element.

In yet another aspect the present invention relates to a floor cable channel comprising multiple detection assemblies as described above connected one another to form a line, wherein
- the calculation units in every second detection assembly are connected via cables so that two independently connected chains are formed; and
- the multiple detection assemblies preferably include at least 6 detection assemblies.

In yet another aspect the present invention relates to a race timing system including a floor cable channel as described above and a decoder connected to a calculation unit of the first and/or second detection assembly in the line, wherein the decoder is configured to synchronize operation of the connected detection assemblies, preferably based on positions of the detection assemblies in the line.

Preferred embodiments of the invention are defined in the dependent claims. It shall be understood that the claimed channel element, detection assembly, floor cable channel and race timing system have a similar and/or identical preferred embodiment as the claimed channel element, detection assembly, floor cable channel and race timing system, in particular as defined in the dependent claims and as disclosed herein.

A channel element has a center protection area in which an antenna can be received and housed to be protected from external forces such as mechanical impact or also weather impact. This center protection area is connected to both connection areas via corresponding protection areas. In the protection areas cables can be housed for the connection of the components in the center protection area to components in other channel elements. In addition to the first and second protection areas the channel element of the present invention provides a bypass area that is designed to house a cable that directly connects the two neighboring channel elements, preferably without interfering with the center protection area.

The channel element of the present invention (mechanically) connects to a preceding channel element on one side and to a following channel element on the other side. A plurality of channel elements can be connected to one another in a line. A channel element having therein an antenna and a calculation unit is referred to as a detection assembly. Multiple detection assemblies can be connected in a line to form a floor cable channel.

In a line of detection assemblies, the calculation units in the different detection assemblies can be connected (to establish a data and/or power connection between neighboring calculation units) via cables running through the first and second protection areas and the bypass protection area(s). Thereby, neighboring calculation units are located in detection assemblies having another detection assembly arranged between them. A cable in the bypass are allows connecting the first protection areas of the preceding and following channel elements. A cable running through the bypass protection area thereby makes it possible that every second calculation unit is connected. Thus, two substantially independent chains of calculation units can be obtained, with one chain including every second calculation unit In comparison to previous approaches in which multiple calculation units are connected in a single line, the approach of the present invention has the advantage that redundancy is provided. If one cable or one calculation unit in one of the chains fails, the other may still be operable. This could result in a lower detection rate. However, at least some detections will still be received.

In comparison to previous approaches in which every antenna has a separate cable to be connected to a decoder arranged at the end of a floor cable channel resulting in multiple cables having to be guided through the floor cable channel, the cabling can be substantially reduced. This results in cost savings and in a substantial weight reduction. Still further, the approach of the present invention makes it possible that longer floor cable channels are implemented, i.e. that a higher number of channel elements can be put together. In particular, it is not necessary that each antenna is connected via a separate cable, but a single or two cables are sufficient. This results in a higher flexibility in accommodating different widths of race tracks and different conditions at start, finish or split-time positions of a race track. A higher flexibility is obtained. Furthermore, an easy reconfiguration becomes possible.

In an embodiment the channel element includes a top portion and a bottom portion connectable to the top portion. The center protection area, the first protection area, the second protection area and the bypass protection area correspond to cavities between the top portion and the bottom portion upon connection, preferably cavities in the bottom portion that are covered by flat segments of the top portion. The use of connectable top and bottom portions allows an efficient manufacturing and maintenance. Furthermore, the use of appropriate cavities allows an efficient shielding of cables and other components in the different protection areas from external forces and environmental impacts. Preferably, the channel element can be manufactured from a plastic material such as polyurethane.

In an embodiment the top portion is designed to overlap the bottom portion in a direction orthogonal to a longitudinal axis of the channel element. Additionally or alternatively, the top portion includes a flexible protrusion portion for accommodating an unevenness of the underlying surface, said flexible protrusion portion preferably extending along a longitudinal axis of the channel element. By designing the top portion to overlap the bottom portion it becomes possible that the components housed in the bottom portion are shielded from rain and/or mechanical stress. The flexible protrusion portion further reduces environmental impact by connecting the channel element to the ground. Herein, the underlying surface particularly refers to the ground on which the channel element and floor cable channel are positioned.

In an embodiment cable outlets at the first connection portion are arranged at a different distance than cable outlets at the second connection portion so that the first connection portion connects to a preceding first connection portion of the preceding channel element and the second connection portion connects to a following second connection portion of the following channel element. In other words, the cable outlets of the channel element are designed asymmetrically so that every second channel element in a line of channel elements faces in the same direction opposite to the direction of the other channel elements. Consequently, a new channel element can only be added to the line of channel elements in a defined orientation. This has the effect that a crossing of cables is avoided. This results in a reduced error proneness. Mechanical stress on the cables is reduced. Errors in the set-up procedure are avoided.

In an embodiment the bypass protection area includes a relay portion and a terminal portion in the area of the second connection portion. The relay portion is designed to connect the first connection portion to the second connection portion. The terminal portion is designed to store an end section of a cable in the bypass protection area in case no following channel element is connected to prevent an overlap of the end section out of the channel element. The relay portion and the terminal portion can alternatively be used to house a cable and, optionally, a plug attached to the cable. If the channel element is the last channel element in a line of channel elements forming a floor cable channel, a cable coming from the preceding channel element can be stored in the terminal portion. Thus, the cable does not overlap out of the channel element in the direction of the second connection portion, i.e. the direction of the (non-existent) following channel element. A cable defect can be avoided. Further, it can be avoided that the overlapping cable causes a tripping hazard or other problems.

In an embodiment the calculation unit includes an RFID reader circuitry for detecting passing RFID tags in spatial vicinity of the antenna and determines a corresponding passing time. Preferably, the RFID reader circuitry is configured to determine the passing time based on an evaluation of a phase change of a detection. The RFID reader circuitry is integrated in the detection assembly and in the channel element. In other words, a decentralized RFID reader set-up with dedicated reader circuitry for each antenna is proposed. This makes it possible that only the cumulated data representing a read or a passing time have to be communicated from the calculation unit to the decoder for further processing. Consequently, the amount of data to be communicated is reduced. A further advantage of this decentralized set-up is an improved robustness due to not having a single point of failure in a central reader. In addition to making use of a signal strength for determining the passing time it is also possible to determine the passing time based on an evaluation of a phase change. In other words, a shift in the phase caused by the movement of the transponder in the direction of the detection assembly or away from the detection assembly is evaluated and used as an input for determining the passing time, i.e. the point in time at which the RFID tag is at a minimum distance from the antenna. The evaluation of the phase change of the detection can thereby result in an improved accuracy of the passing time detection.

In another embodiment of the detection assembly the calculation unit and the antenna are arranged on two printed circuit boards being stacked with a spacer layer in between, in particular a polystyrene layer. The spacer layer makes it possible that interference is reduced to increase a detection rate. By making use of an antenna on a printed circuit board it becomes possible to use a patch antenna that is efficiently manufacturable. Costs are reduced. Further, custom antenna designs optimized for the use in race timing applications can be used. Still further, robustness can be increased and repairability can be improved by making use of two printed circuit boards.

In an embodiment of the detection assembly the calculation unit includes a voltage detection circuitry for detecting whether power is provided to the calculation unit via the first cable or via the second cable. The voltage detection circuitry of the calculation unit allows detecting from which one of the neighboring calculation units power is provided. Based on this information it becomes possible to communicate with the other calculation units and, in particular, with a decoder connected to one of the calculation units, preferably at one end of the chain of calculation units or the cable channel, respectively. By detecting whether power is provided to the calculation unit via the first cable or via the second cable it becomes possible to flexibly connect detection assemblies to form a floor cable channel of definable length to accommodate the circumstances at the desired set-up position. A desired number of channel elements can be connected to one another upon setup and with little or no prior installation effort.

In an embodiment the calculation unit includes a data bus circuitry to provide a data bus communication with further calculation units of further detection assemblies connected via the first cable and via the second cable in a daisy chain. Preferably, the data bus circuitry is configured to provide a controller area network (CAN) bus communication. A daisy chain thereby corresponds to a wiring scheme in which multiple calculation units are wired together in sequence to form a chain of calculation units. A serial connection and a serial communication is provided. Each one of the calculation units in the chain is connected to its neighbors on both sides. The CAN bus protocol was originally developed for use in automotive applications. However, the CAN bus protocol can also be used in other applications. In the present invention, it has been recognized that a CAN bus communication, i.e. the use of the CAN bus protocol, provides the necessary functions for connecting multiple detection assemblies. Alternatively or additionally to making use of a CAN bus, it is also possible to use other systems, such as RS-485 or Powernet. In comparison to previous approaches in which each detection assembly is separately connected to the decoder, the cabling is minimized to safe costs and allow for easy and efficient reconfiguration. By making use of a standard bus protocol the reliability of the implementation can be improved.

In an embodiment the calculation unit includes a terminal detection circuitry for detecting whether the calculation unit is connected to only one of the first neighboring calculation unit and the second neighboring calculation unit. Preferably, the terminal detection circuitry is configured to switch a resistor to terminate a data bus when it is detected that the calculation unit is not connected to the first neighboring calculation unit and/or to the second neighboring calculation unit. In bus systems, it is usually required that the bus is terminated so that the communication can be established. In the present invention this bus termination is implemented via the terminal detection circuitry. Thereby, this terminal detection circuitry allows flexible reconfigurability. In particular, it can be recognized whether a connection to a further detection assembly is established or not. For this, the terminal detection circuitry may be configured to repeatedly perform a respective detection in regular intervals. During operation, a determination whether only one calculation unit is connected allows for a detection of defects. For instance, the terminal detection circuitry makes it possible to detect if a detection assembly fails. Then a corresponding reaction can be triggered, for instance by informing an operator. In comparison to previous approaches with a predetermined number of detection assemblies the use of the terminal detection circuit makes it possible to flexibly reconfigure the communication during use. A highly flexible race timing system is obtained.

In an embodiment the calculation unit includes a position detection circuitry for detecting a first number of calculation units connected via the first cable and/or a second number of calculation units connected via the second cable. This again results in a detection of a position of the calculation unit in the daisy chain. In other words, it becomes possible that the calculation unit detects its own location in the chain of calculation units thereby enabling an efficient communication between the calculation units. In comparison to previous approaches with multiple detection assemblies combined to form a line, the position detection circuitry enables a simple communication scheme and a flexible reconfiguration, also at runtime. A robust operation and a detection of failures becomes possible.

In an embodiment the calculation unit includes a reconfiguration circuitry for detecting a change in a first number of calculation units connected via the first cable and/or a second number of calculation units connected via the second cable. This detection allows for a reconfiguration at runtime. For instance, if one detection assembly in the floor cable channel fails or needs to be replaced, the reconfiguration circuitry allows for the communication to be reestablished. By detecting a change in a number of calculation units it becomes possible to reconfigure the communication if necessary. A robust operation becomes possible.

In an embodiment of the detection assembly the calculation unit is connectable to the first cable and/or the second cable by means of a first connector part and a second connector part that are designed for being screwed together to establish an electric connection, in particular an electric connection having four conductors. Preferably, the first connector part and the second connector part include printed circuit boards. Preferably, the first connector part and/or the second connector part include at least one pogo pin for establishing the electric connection upon being screwed together. Preferably, the first connector part includes a threaded connector for receiving a screw, in particular a soldered threaded connector and the second connector part includes a hole for the screw. Preferably, the first connector part and/or the second connector part are designed for holding a sealing in between for protecting the electric connection from moisture. In order to transfer electric signals from one calculation unit to the next a reliable connection is required, in particular if multiple calculation units are arranged in a line of detection assemblies. The first connector part can be located at the side of the calculation unit and, e.g., connected to the calculation unit via conducting paths on a printed circuit board. The second connector part can be located at the side of the cable and soldered to one or more conductors of the cable. Usually, the connector parts provide a connection of multiple electrical conductors (signal paths). A screw is used to connect the two connector parts by screwing them together. In comparison to plug-and-socket connection this screwing together has the advantage that a mechanically robust connection can be established. Further, a small required construction space becomes possible. Still further, it becomes possible to use printed circuit boards and automated component placement and soldering so that an efficient manufacturing is enabled. The screw can be a screw that allows for manual operation without a screw driver to make an efficient reconfiguration of the detection assemblies possible. The connectors are mechanically robust in a connected state and in an unconnected state.

In an embodiment of the floor cable channel a connection portion of a first channel element is designed for being connected to a connection portion of a second channel element by means of a connection element allowing a rotational movement of the first channel element relative to the second channel element about a rotational axis orthogonal to a first longitudinal axis of the first channel element and orthogonal to a second longitudinal axis of the second channel element. By means of said rotational movement, the floor cable channel is brought into a transport position in which the channel elements are parallel to each other and into an operating position in which the channel elements are arranged one behind the other along their longitudinal axis. The connection element thereby connects two neighboring channel elements so that a folding mechanism is provided. This folding mechanism allows that the different channel elements, i.e. the different detection assemblies, can be transported in a connected state so that no separate connection is needed upon deployment. This enables a fast and efficient set-up since the floor cable channel only has to be unfolded at the desired location. Furthermore, an erroneous set-up due to lack of experience of the personnel on site can be avoided. An efficient transport and set-up become possible.

In an embodiment of the race timing system, the race timing system includes a further decoder connected to a calculation unit of the last and/or last-but-one detection assembly. In case a single chain is formed, it is sufficient to connect the decoder to the last detection assembly. However, if two independently connected chains are formed as outlined above, the decoder is usually connected to the last and last-but-one detection assemblies. The further decoder thereby relates to an additional decoder in addition to the first decoder. This set-up thereby provides a further redundancy in case of failure of one of the decoders or in case of a defect that impedes communication through a certain position in the floor cable channel. Redundancy and reconfigurability are further improved.

Herein, the term circuitry can refer to a hardware implementation by means of different individual electronic components, such as resistors, transistors, capacitors, inductors and dials. It is, however, also possible that the term circuitry refers to a function implemented in a microcontroller. This implementation can thereby be based on soft- and/or hardware. All combinations are possible, for instance, a portion of the circuitry being implemented in hardware and another portion being implemented in the form of software running on a microcontroller. In particular, it is possible that the calculation unit is implemented in the form of a microcontroller that also, at least partly, carries out further functions. An external force or an environmental impact can be a mechanical impact, for instance from a runner stepping onto the channel element or a vessel passing over the channel element. An external force or an environmental impact can also be a weather condition, such as rain, cold/hot temperatures, dust etc.

Herein, a sports timing transponder particularly refers to a passive RFID tag that has no integrated energy source but is activated to send out its identity by an RFID reader. However, in certain embodiments, a sports timing transponder may also correspond to an active RFID tag. A sports event is particularly a running event such as a marathon or the like. However, a sports event can also be a bike race, a car race, a ski race, a horse race, a swimming competition etc. An identity of a sports timing transponder can particularly be an alphanumeric number of the RFID tag. This alphanumeric identifier is programmed to the transponder upon manufacturing. The determination of a passing time may include activating and reading the identity of the sports timing transponder multiple times. The time of the strongest read could then, e.g., be considered to represent the passing time (passing time detection based on received signal strength). As used herein, the term decoder refers to a piece of hardware that is used at a sports event to determine passing times of passing sports timing transponders. A decoder does not necessarily decode any signal. In particular, a decoder does not necessarily include an RFID reader. The term center protection area does not mean that the corresponding area is necessarily arranged in the geometrical center. An offset is possible.

BRIEF DESCRIPTION OF THE DRAWINGS

These and other aspects of the invention will be apparent from and elucidated with reference to the embodiments described hereinafter. In the following drawings

DETAILED DESCRIPTION

Figure 1:
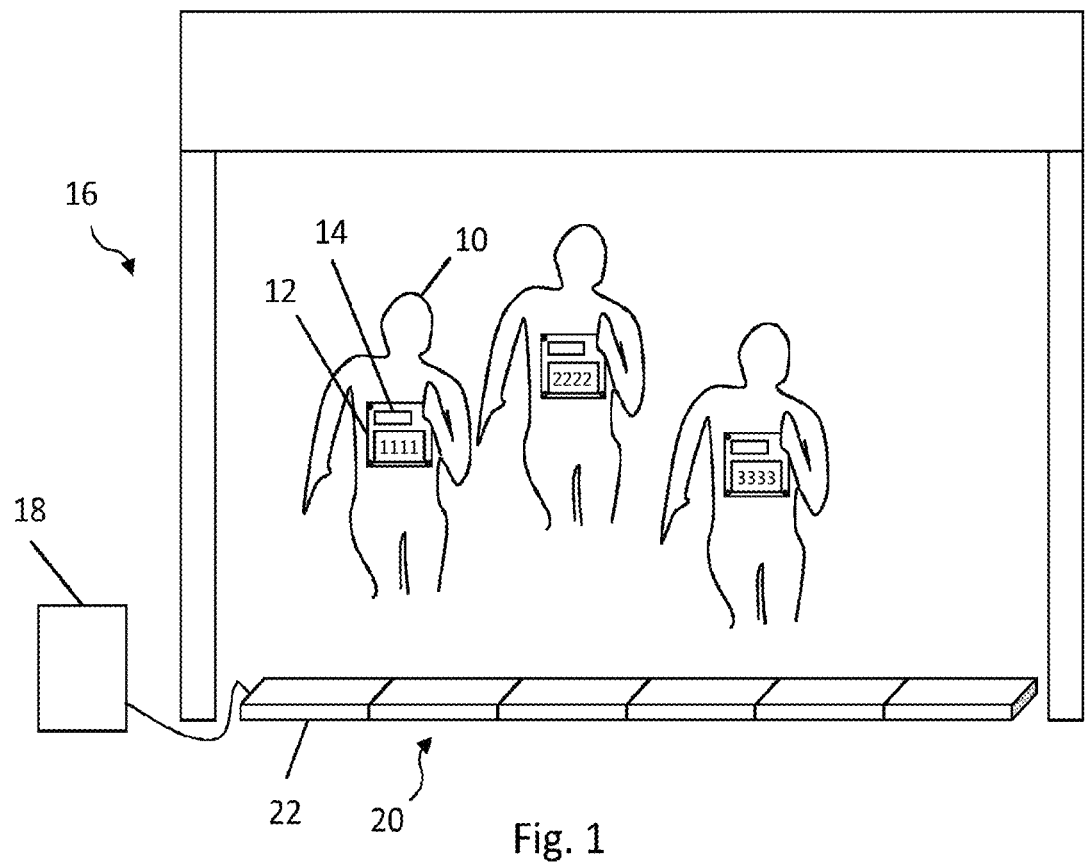
FIG. 1 shows a schematic illustration of participants of a sports event having a passing time measured by a race timing system according to an aspect of the present invention.

In FIG. 1 a plurality of participants participating in a sports event is schematically illustrated. The participants 10 may particularly be runners in a running event such as a marathon or the like. A participant 10 is identified by means of a bib number 12 corresponding to a participant ID. The bib number 12 can, e.g., be attached to the participant's shirt, to a handle bar of a bike or to a chassis of a race car. In the illustrated example, the bib number 12 has attached thereto a passive RFID sports timing transponder 14. This sports timing transponder 14 is used for carrying out a measurement of a passing time and for determining the identity via RFID when the participant 10 crosses the start or finish line or passes a split time measuring point.

In order to carry out the measurement of the passing time, the present invention proposes to make use of a race timing system 16 that includes a decoder 18 and a floor cable channel 20 that comprises multiple channel elements 22. In at least some of the channel elements 22 an antenna is arranged for reading out the passing sports timing transponders 14 in order to determine their passing times. Herein, a channel element 22 with an antenna and a calculation antenna arranged therein is referred to as a detection assembly.

FIGS. 2 to 7 show different views of an embodiment of a decoder 18 according to an aspect of the present invention. In FIGS. 2 to 7 but also in all other figures, corresponding reference numerals refer to the same components, respectively. However, not all reference numerals are inserted in all figures for the benefit of a clearer representation. For the same reason it is sometimes refrained from inserting the same reference numerals multiple times in a single figure to designate several similar components.

The decoder 18 in FIGS. 2 to 7 includes a reader interface 24, a cable connection interface 26, a user interface 28, a housing 30 and a processing unit that is arranged within the housing 30.

According to the invention, the user interface 28 is arranged on an outside of the housing 30. In the illustrated example, the user interface 28 includes a display 32 via which configuration feedback is provided to a user in addition to multiple buttons 34 that allow for the user to interact with the decoder 18 and, e.g., provide configuration information. Particularly, the user can obtain information on a status of the decoder 18 and the current readouts via the user interface 28. For instance, passing times of sports timing transponders or also IDs of passing sports timing transponders can be displayed.

In the illustrated exemplary embodiment, the user interface 28 is arranged on a top side of the housing 30 facing upwards when the decoder 18 is put on a ground surface. The user interface 28 is resistant to rain or splash water and/or resistant against further environmental impacts such as direct sunlight or mechanical stress etc., thereby allowing an operation in outdoor applications. Preferably, the display 32 can be implemented in the form of a monochrome LCD display that can be read out during daylight, if illuminated by the sun. It is possible that the display 32 is additionally equipped with a multicolor screen back-lighting and can thus be illuminated in different colors. Via this additional information it becomes possible to efficiently inform a user of configuration parameters such as, for example, information about a timing position to which the decoder 18 is currently assigned.

The cable connection interface 26 particularly includes a network cable connector and/or a computer interface cable. In the illustrated example, the cable connection interface 26 includes three different network cable connectors 36 (network sockets), a regular USB connector 38 as well as a USB-C connector 40. The USB connector 38 and the USB-C connector 40 are configured for connecting a computer interface cable corresponding to a USB cable. The cable connection interface 26 may include further interfaces such as a power interface 41 for connecting a power cable and others.

Figure 5:
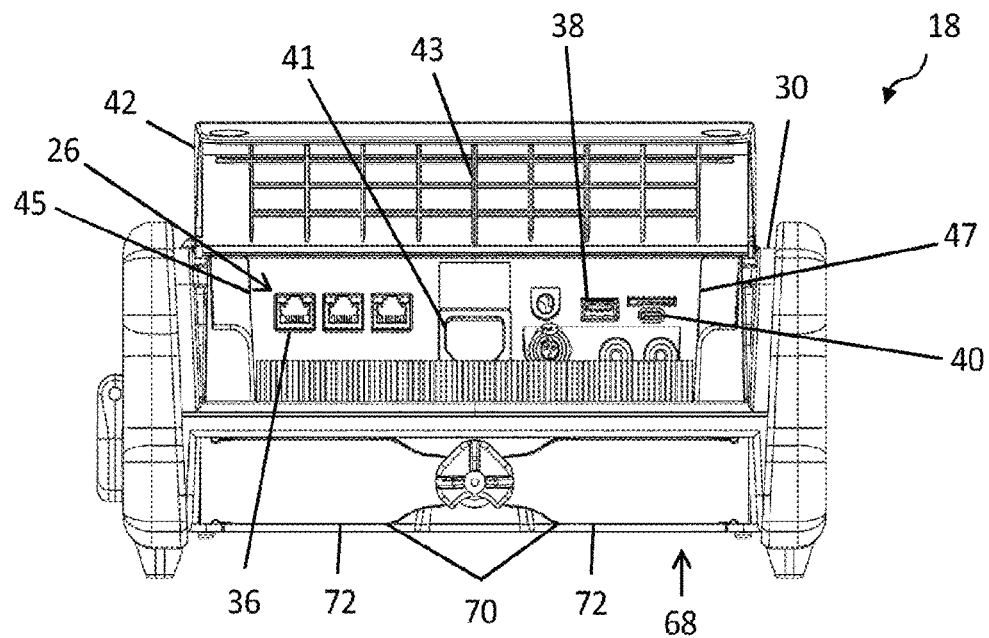
FIG. 5 shows a schematic illustration of a cable connection interface of the decoder arranged under the protective flap.

In order to protect the connectors from environmental impacts, in particular splash water, the cable connection interface 26 is arranged under a protective flap 42. Thereby FIGS. 2, 4, 6 and 7 illustrate a closed state of the protective flap 42 whereas FIGS. 3 and 5 illustrate an open state of the protective flap 42 in which the cable connection interface 26 can be accessed.

The protective flap 42 is preferably arranged to cover an upper portion of a front side of the housing 30. Thereby, the front side corresponds to a side of the housing 30 that is essentially oriented in a 900 angle to the top side of the housing and faces in the direction of the user when the user reads the display 32. As illustrated in FIGS. 3 and 5, the protective flap 42 can be opened to allow access to the cable connection interface 26. When the protective flap 42 is flapped open, cables can be connected and disconnected.

In the illustrated embodiment the protective flap 42 is hinged pivotably about a pivot axis 44 that is substantially parallel to the top side of the housing and the front side of the housing. As illustrated, the pivot axis 44 is positioned in a top side plane of the housing 30.

Figure 2:
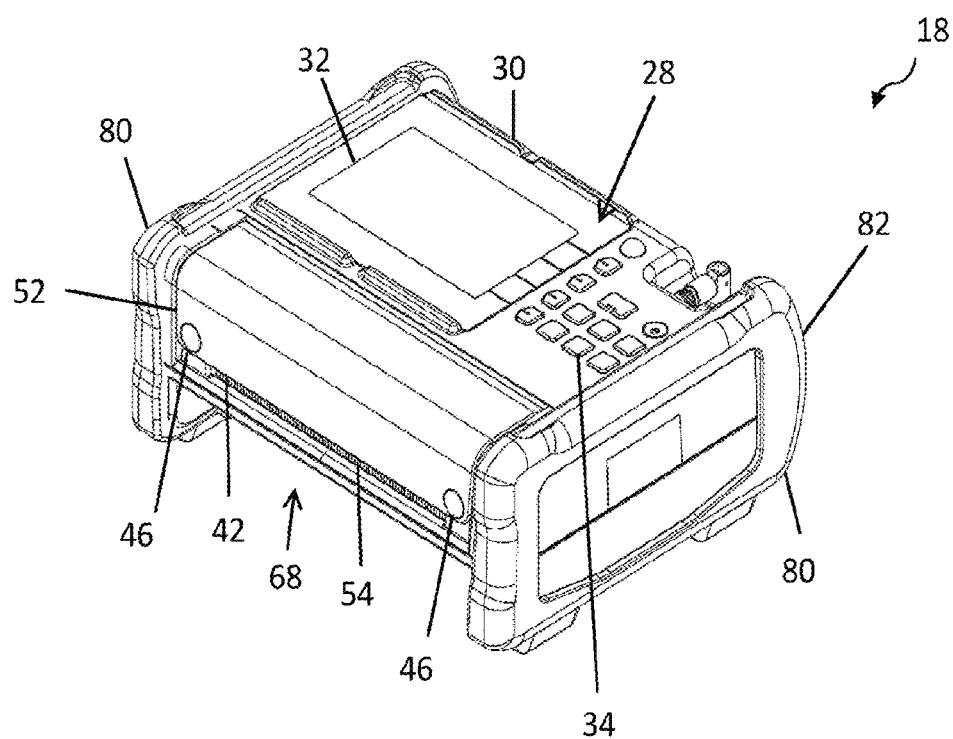
FIG. 2 shows a schematic perspective illustration of a decoder for a race timing system according to an aspect of the present invention with a protective flap in a closed state.
Figures 3, 4:
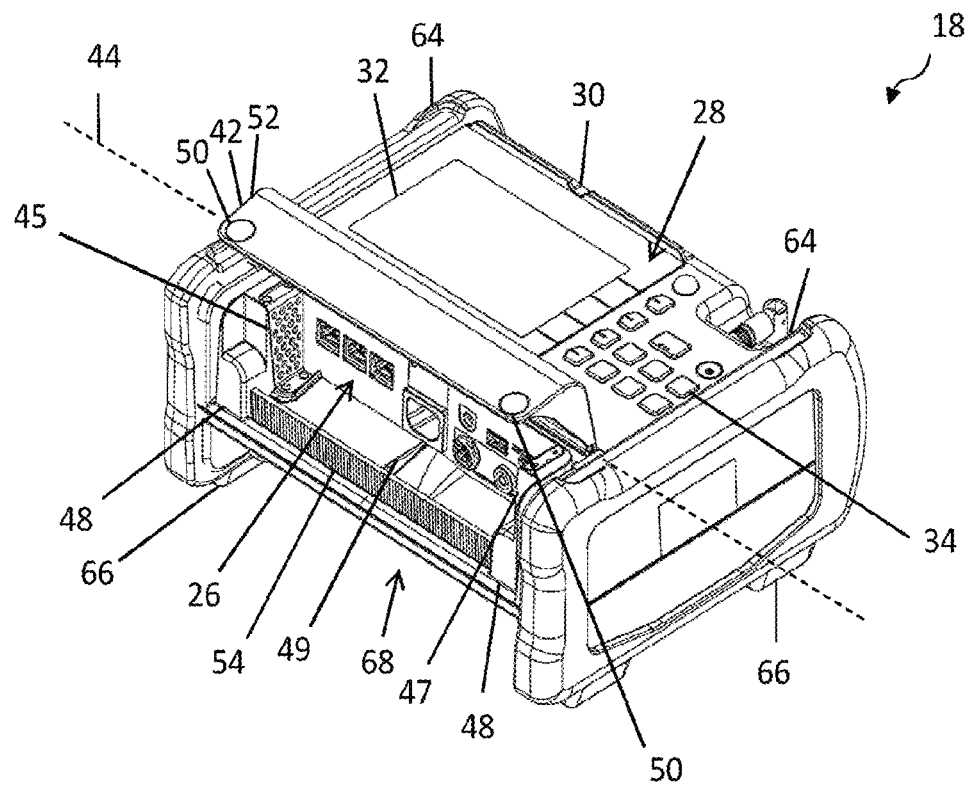
FIG. 3 shows a schematic perspective illustration of the decoder with the protective flap in an open state.
FIG. 4 shows a schematic perspective illustration of a reader interface of the decoder.

As it can be seen in FIGS. 2 and 3, the protective flap 42 may particularly have a curved shape that, in the illustrated embodiment, spans an angle of 90°. In order to lock the protective flap 42 in place, the illustrated embodiment of the decoder 18 includes a housing 30 having a locking mechanism 46. This locking mechanism 46 comprises at least one magnet 48 for magnetically holding the protective flap 42 in the closed state. In the illustrated embodiment, two magnets 48 are positioned in a portion of the housing 30 that is covered by the protective flap 42 in a closed state. The magnets 48 interact with corresponding counterparts 50, in particular magnets or metal plates that are integrated in the protective flap 42. When the protective flap 42 is closed, it is kept in place by the magnets 48 interacting with the counterparts 50. It is to be understood that the positions of the magnets and the counterparts can thereby also be switched.

In the illustrated embodiment, the protective flap 42 includes a lower portion 52 that, in a closed state, covers a section of the housing 30 below the cable connection interface 26. This makes it possible that rain or splash water that impacts the decoder 18 cannot reach the cable connection interface 26 and the connectors arranged therein in spite of capillary effects.

Further, in the illustrated embodiment, the housing 30 includes a brush extension 54 that reaches to the lower portion 52 of the protective flap 42 in the closed state. The brush extension 54 thereby corresponds particularly to a brush that allows cables to pass through the bristles but blocks splash water and water running along a cable from entering into the cable connection interface 26. The bristles of the brush extension 54 further improve the resilience against environmental impacts by providing an additional barrier.

In the illustrated embodiment, the reader interface 24 is arranged on a back side of the housing 30 and includes a passive RFID connector 58 as well as a loop antenna connector 60.

The passive RFID connector 58 connects to one or more RFID reader circuitries which again have an antenna connected. The passive RFID connector 58 is configured to receive detections of passive RFID sports timing transponders. In particular, the passive RFID connector 58 can be configured for connecting thereto a floor cable channel including multiple detection assemblies, each having an antenna and circuitry for detecting RFID tags.

The loop antenna connector 60 is configured to connect to an induction loop for communicating with active sports timing transponders. In particular, an electric field can be induced that can then be detected by active RFID sports timing transponders. The active RFID sports timing transponders can themselves calculate a passing time and transmit their passing time, for instance, via a wireless connection and a wireless communication antenna 62 of the decoder 18.

In the illustrated embodiment, the decoder 18 includes a top connection portion 64 that is arranged in the area of the top side of the housing 30 and a matching bottom connection portion 66 that is arranged in the area of a bottom side of the housing 30. The top connection portion 64 and the bottom connection portion 66 work together to provide for a stackability of multiple decoders 18. Thereby, it is possible that the top connection portion 64 provides two recesses on the top side of the housing 30 into which two or four protrusions on the bottom side of the housing 30 forming the bottom connection portion 66 can extend. The stackability thereby provides for a better storability of multiple decoders 18. Multiple decoders 18 can be stacked one over the next.

In the illustrated embodiment the housing 30 includes a recess 68 in the area of the bottom side of the housing 30 that provides a space for opening and closing the protective flap 42 of a below-stacked further decoder. Thus, if multiple decoders are stacked one over another, it is still possible to open their protective flaps 42 since, in the open state, the protective flap 42 can extend into the recess 68 of the above-stacked decoder 18. This results in an accessibility of the cable connection interface 26 of all decoders in a stack of decoders.

Figure 6:
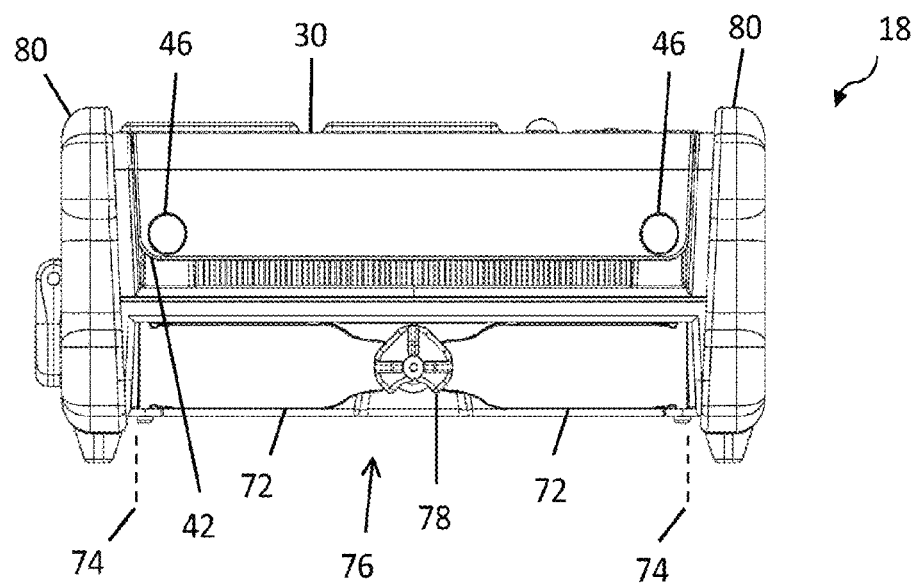
FIG. 6 shows a schematic illustration of a brush extension of the decoder.
Figure 7:
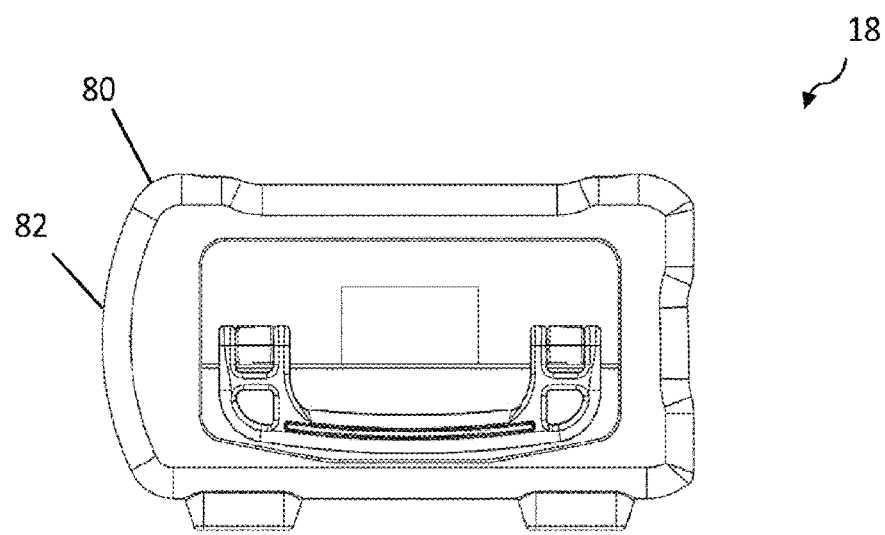
FIG. 7 shows a schematic side view illustration of the decoder.

Still further, the decoder 18 in the illustrated embodiment includes two battery compartments 70 that are configured to house two batteries. A battery fixation mechanism 76 makes it possible that batteries are housed and fixated in the battery compartments. For this, the battery fixation mechanism 76 includes two further protective flaps 72 and a closing element 78. The battery compartments can be closed by means of the two further protective flaps 72. The further protective flaps 72 can, e.g., pivot about two pivot axes 74, as illustrated in FIG. 6, to allow access to the batteries. The closing element 78 allows for fixating the two protective flaps 72 in a closed position.

Thereby, the closing element 78 is configured to simultaneously close both further protective flaps 72 in a first position and to selectively close only one of the further protective flaps 72 while opening the other of the further protective flaps 72 in a second and third position. In the illustrated embodiment, the closing element 78 is implemented in the form of a pivotable and irregularly shaped element that mechanically fixates both or one of the two further protective flaps 72. The pivot axis of the closing element 78 is thereby perpendicular to the illustrated plane of projection in FIGS. 5 and 6. Preferably, it is possible that the closing element 78 is held in one of the first, second and third position by means of a spring or another locking mechanism. The closing mechanism 78 makes it possible that one battery is replaced while the other battery remains fixated in the battery compartment 70. Thus, power supply can be maintained while changing one of the batteries. The two further protective flaps 72 are preferably transparent to allow a user to visually assess a presence and/or a charging state indication of a battery in a battery compartment 70. It is also possible that the charging state of the batteries assessed while the decoder itself is not operated and/or in a low-power mode. In combination with the stackability as described above, the transparency makes it possible that a presence and/or charging state of the batteries is assessed also while multiple decoders are stacked one over the other.

The decoder 18 may further include a bumper element 80. In the illustrated embodiment, the bumper element 80 comprises two rubber elements that embrace the housing 30 on a left and right side. The bumper element 80 thereby in-creases a resistance of the decoder 18 against mechanical stress during storage or during operation at a site of a sports event. As illustrated in the profile view in FIG. 7, the bumper element 80 thereby has a protrusion 82 on the back side of the housing 30 opposite to the side of the protective flap 42. In the illustrated embodiment this protrusion 82 is formed so that the decoder 18 tips over when being placed on the protrusion 82. The protrusion 82 corresponds to a rounded portion of the bumper element 80. In other words, the shape of the bumper element 80 is irregular so that the decoder cannot securely stand on the ground when the protrusion 82 faces downwards. This makes it impossible to place the decoder 18 in a position in which the protective flap 42 and the below-arranged cable connection interface 26 face upwards. Thus, even if a user tries to place the decoder 18 with the cable connection interface 26 facing upwards in the direction of pouring rain, this is not possible.

Figure 8:
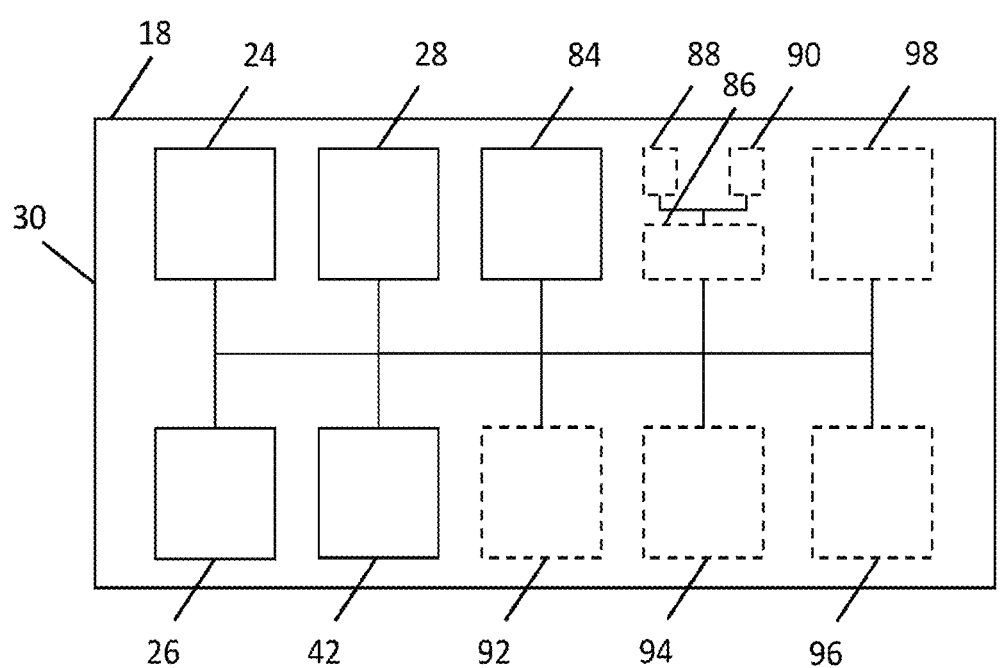
FIG. 8 shows a schematic illustration of different mandatory and optional components of the decoder.

FIG. 8 schematically illustrates the decoder 18 and its various components. Therein, dashed lines indicate optional components. The decoder 18 includes a reader interface 24, a cable connection interface 26, a user interface 28, a processing unit 84, a housing 30 and a protective flap 42.

Optionally, the decoder 18 includes a ventilation unit 86 for ventilating an inside of the housing 30 with outside air. In the illustrated embodiment, a ventilation outlet 45 and a ventilation inlet 47 are arranged under the protective flap 42 so that they are protected from environmental impacts, in particular splash water and rain. Air can enter and exit from the space under the protective flap 42 in the closed state through corresponding openings, e.g. underneath the lower portion 53 of the protective flap 42.

As further illustrated, it is possible that the protective flap 42 includes a barrier protrusion 43 that forms an airflow barrier between the ventilation outlet 45 and the ventilation inlet 47 under the protective flap in the closed state and blocks air from directly flowing between the inlet and the outlet. In the illustrated example the barrier protrusion 43 corresponds with a lower protrusion 49 arranged in the space under the protective flap 42 in the closed state. However, other mechanical implementations are possible in this respect.

Particularly, this barrier protrusion 43 can include an opening for a plug of a power cable. When a power cable is plugged in the opening is closed and the airflow between the inlet and the outlet is blocked while charging batteries or performing other power consuming operations that require ventilation. It is possible that the ventilation unit 86 is thereby controlled based on a reading of a temperature sensor 88 and a humidity sensor 90 that are arranged within the housing 30. The ventilation strength of the ventilation unit 86 is thereby adjusted to prevent water condensation in the inside of the housing that might cause harm to the electronic components included in the housing 30. The combination of a temperature sensor 88 with a humidity sensor 90 has the advantage that water condensation in the housing can be prevented also in situations where it is cold outside.

Further optionally, the decoder 18 can include an RFID chip 92 for carrying information on the decoder 18. In particular, the RFID chip 92 is programmable via the processing unit 84. This makes it possible that even if the processing unit 84 is not operating or switched on (e.g. in order to save energy), information on the decoder 18 can be obtained by reading out the RFID chip 92 with a corresponding reader. For instance, if multiple decoders 18 are stored, an inventory control is facilitated. By programming the RFID chip 92 with the processing unit 84 it is possible to further write information on the RFID chip 92. For instance, the recharging state of a battery can be provided as further information to be read out. Energy can be saved since a readout is possible if the decoder 18 and processing unit 84 are not powered at all or run at a very low power consumption.

Further, it is possible that the decoder 18 includes an active RFID reader processing circuit 94 for determining passing time of active sports timing transponders. This active RFID reader processing circuit 94 can particularly interact with an induction loop connected to the loop antenna connector. The active RFID sports timing transponders may wirelessly transmit information to a wireless communication antenna of the decoder.

Still further, the decoder 18 may include a heating unit 96 for heating at least one battery in one of the battery compartments. This heating unit may particularly include an aluminum board that is arranged close to the batteries (in particular over the batteries) in the battery compartments. By heating the batteries or warming the batteries it becomes possible to operate the decoder 18 also in cold environments (in particular to enable charging the batteries in cold environments) and increase runtime and lifetime of the batteries.

Still further, the decoder 18 may include a communication unit 98 for communicating via a mobile communication network. In particular, it is advantageous if the communication unit 98 has a first SIM module for receiving a first physical or virtual SIM card and a second SIM module for receiving a second physical or virtual SIM card. By making use of two SIM cards, it becomes possible that one SIM card is accessed by the user whereas the other SIM card is arranged internally and cannot be accessed by the user. Thus, it is possible that a user inserts his own SIM card and communicates via his wireless network of choice, whereas another SIM card is provided by a service provider and assures that the service provider can access the decoder 18 for providing software updates etc. independently of the user's own SIM card and mobile network connection.

The processing unit 84 is configured to control the different components. Furthermore, the processing unit 84 may process data received via the reader interface 24 and communicate the processed data to the internet. The processing unit 84 may also control components, in particular detection assemblies connected via the reader interface 24, e.g. by providing a synchronization signal or configuration parameters. The processing unit 84 may particularly be implemented in the form of a microcontroller or system-on-chip (SoC) running a corresponding software.

Figure 9:
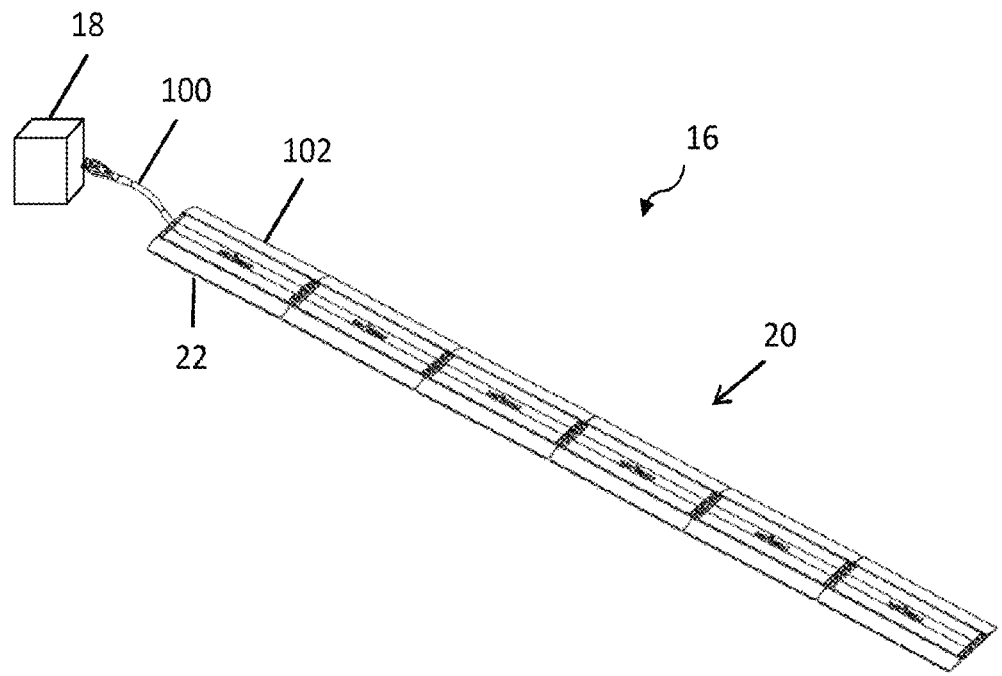
FIG. 9 shows a schematic illustration of a floor cable channel according to an aspect of the present invention.

FIG. 9 shows a schematic illustration of the race timing system 16 according to an aspect of the present invention. The race timing system 16 includes a decoder 18 in addition to a floor cable channel 20 having six channel elements 22, each including an antenna and a calculation unit to form a detection assembly 102. The cable channel 20 is connected to the decoder 18 via a cable 100 connecting a calculation unit in a detection assembly 102 to the reader interface of the decoder 18.

The floor cable channel 20 includes multiple detection assemblies 102, each comprising an antenna and a calculation unit housed in a channel element 22. The channel element 22 thereby corresponds to a mechanical protection of the antenna and the calculation unit connected to the antenna to protect the antenna and calculation unit from external forces such as vessels passing over the floor cable channel 20, weather conditions like snow or rain, or participants of a running event etc. The multiple detection assemblies 102 thereby form a line. The number of detection assemblies 102 in a line or in a floor cable channel 20 is thereby flexible. For instance, six detection assemblies 102 can be connected.

Figure 10:
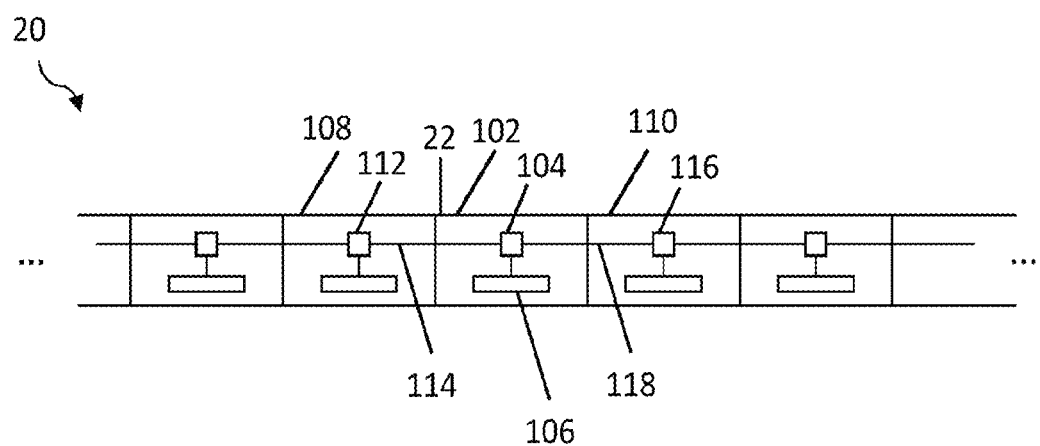
FIG. 10 shows a schematic illustration of multiple detection assemblies being connected in a daisy chain.
Figure 11:
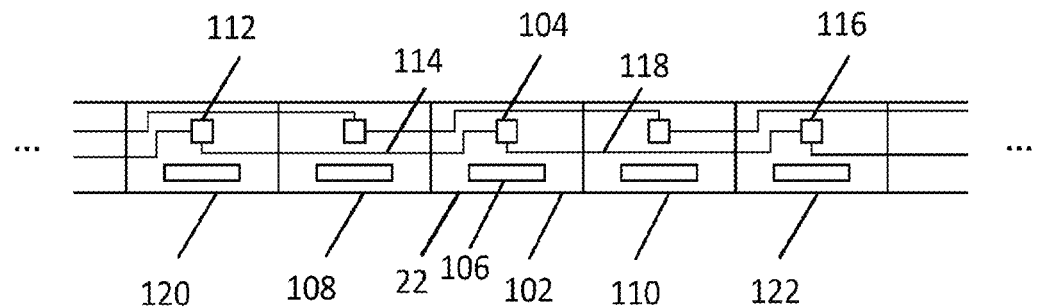
FIG. 11 shows a schematic illustration of an alternative connection of the multiple detection assemblies in a daisy chain.

FIGS. 10 and 11 illustrate different options for the wiring of the multiple detection assemblies 102 of a floor cable channel 20. Each detection assembly 102 includes a channel element 22, a calculation unit 104 and an antenna 106. Each channel element 22 is connected to a preceding channel element 108 and a following channel element 110. It is to be understood that the following and the foregoing description is thereby outlined from the point of view of the detection assembly 102 in the middle of the illustrated floor cable channel 20 but that the concept is applicable to all the different detection assemblies 102.

As illustrated in FIG. 10, the calculation unit 104 can be connected to a first neighboring calculation unit 112 via a first cable 114 and to a second neighboring calculation unit 116 via a second cable 118. Thereby, the first cable 114 extends into the preceding channel element 108 and the second cable 118 extends into the following channel element 110.

FIG. 11 shows an alternative configuration. The calculation unit 104 is connected via the first cable 114 to a first neighboring calculation unit 112 located in a pre-preceding channel element 120. Thereby, the pre-preceding channel element 120 corresponds to the channel element preceding the preceding channel element 108. Similarly, the calculation unit 104 is connected to a second neighboring calculation unit 116 located in a post-following channel element 122. In other words, every second calculation unit 104 in the floor cable channel 20 is connected so that essentially two chains of communication are formed. The cables are bypassed through the preceding channel element and the following channel element, respectively. By making use of two chains of communication it becomes possible to improve resilience against mechanical defects. For instance, if one line of communication is damaged, there still exists another line of communication so that at least part of the detections can still be made. For better legibility, FIG. 11 does not show the connection between each calculation unit 104 and antenna 106 in the channel elements.

Figure 12:
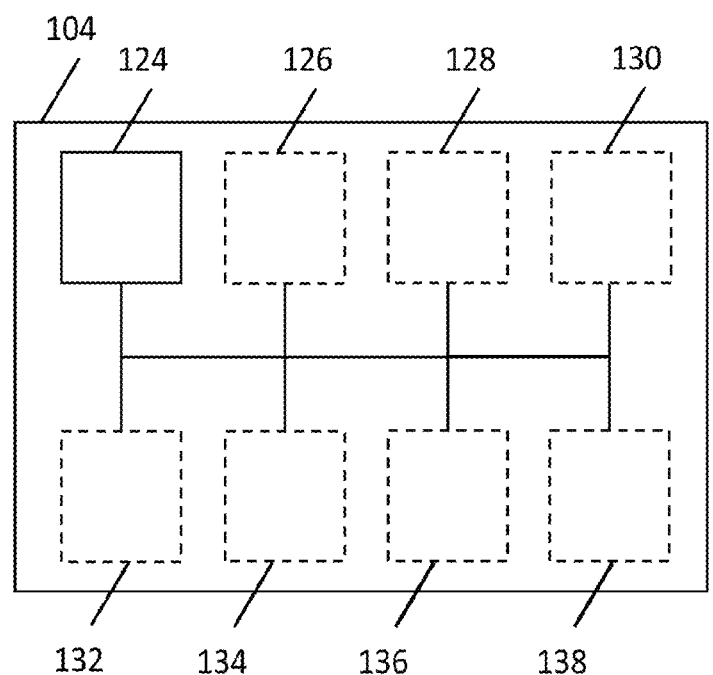
FIG. 12 shows a schematic illustration of the different components of a calculation unit in a detection assembly of the present invention.

FIG. 12 schematically illustrates a calculation unit 104 of a detection assembly. The calculation unit 104 includes a voltage detection circuitry 124. Optionally, the calculation unit 104 includes a data bus circuitry 126, a terminal detection circuitry 128, a position detection circuitry 130, a reconfiguration circuitry 132, a communication circuitry 134, a defect detection circuitry 136 and an RFID reader circuitry 138. Thereby, the different components (circuitries) can be partly or completely implemented in soft- and/or hardware. It is possible that one component fulfills the functionalities of multiple of the circuitries. In particular, the calculation unit 104 can correspond to a microcontroller having multiple peripheral and other electronic components connected thereto. The calculation unit can also be referred to as a reader unit or as an RFID reader.

The voltage detection circuitry 124 is configured to detect whether power is provided to the calculation unit 104 via the first cable or via the second cable. In particular, this makes it possible to determine via which of the two cables the calculation unit 104 is connected to a decoder providing the power supply and receiving the determined information from the passing sports timing transponders. It is thereby possible that the voltage detection circuitry 124 includes a metal oxide semi-conductor field-affect transistor that enables a through-switching of electrical power from one calculation unit to the next in the chain. Alternatively, it is possible that a bipolar junction transistor (BJT), a relay or another switch is used. Upon start-up of the detection assembly, i.e. upon initial power connection, the voltage detection circuitry 124 determines from which side power is provided. Then, a through-connection is initialized so that power is connected through to the respective neighboring calculation unit. During operation and in case power is lost (new set-up, reconnection, reconfiguration etc.) a corresponding memory portion is deleted and it is detected from which of the first cable and second cable power is provided anew.

The data bus circuitry 126 may provide a data bus communication with further calculation units of further detection assemblies connected via the first cable and the second cable in a daisy chain. A data bus communication thereby refers particularly to serial bus communication that provides a communication with or without a host device. In particular, it is possible that the data bus circuitry 126 provides a CAN bus communication. Alternatively, another bus system can be used, in particular a differential bus system such as RS-485. Also, Powernet can be used. The different calculation units connected to one another in a chain may communicate with a processing unit positioned in a decoder connected to the floor cable channel. A serial communication is established.

The terminal detection circuitry 128 allows detecting whether the calculation unit 104 is connected to only one of the first neighboring calculation unit and the second neighboring calculation unit. For instance, a resistor may be switched to terminate the data bus if no further calculation unit is connected. Upon initial start-up the default operation is preferably that each of the calculation units in the chain terminates the data bus communication. If power is connected to the first calculation unit in the chain, it is checked whether a neighboring calculation unit acts on one of the data pins of the bus communication. Only if this is the case, the data bus is connected through to the respective neighboring calculation unit. This allows for assuring that the data bus communication can be established. In order to detect defects in the data bus communication, a time-out functionality can be implemented. If a predetermined time passes after no data bus communication is possible, then the terminal detection circuitry 128 again terminates the data bus communication and only reestablishes the communication upon determining that the respective neighboring calculation unit acts on one of the data pins. This makes a reconfiguration during runtime possible.

The position detection circuitry 130 makes it possible to detect a number of calculation units connected via the first cable and/or a number of calculation units connected via the second cable. Thereby, the position detection circuitry 130 can announce its presence on the data bus upon start-up. In a centralized communication scheme with a central host or master, it can then be attributed a number corresponding to its position in the chain from this master. Alternatively, it is also possible that upon receipt of the start-up message from the new calculation unit in the chain, all other calculation units that are already present in the chain provide a reply message on the data bus so that the position detection circuitry can assess a number of calculation units already present and can attribute a next higher number to itself corresponding to its position in the chain. Other possible solutions include that only the other calculation unit with the currently highest ID replies.

The reconfiguration circuitry 132 allows for detecting a change in a number of calculation units connected via the first cable and/or a change in a number of calculation units connected via the second cable. This again allows for detecting a defect of one of the calculation units in the chain during runtime or a reconfiguration of the floor cable channel during runtime.

The communication circuitry 134 may particularly be suitable for communicating with a decoder and a processing unit of this decoder that is connected via the first cable or via the second cable. The communication circuitry 134 can thereby provide for a data bus communication, preferably a CAN-bus communication. It is possible that the communication circuitry 134 is configured to receive from the decoder a synchronization signal for synchronizing operation of the calculation units in the line of detection assemblies or in the chain of calculation units, respectively. Further, it is possible that a position information is received from the decoder indicating a position of the calculation unit in a chain of calculation units from the point of view of the decoder. This position information may form the basis for an efficient bus communication.

The defect detection circuitry 136 provides for detecting defects in the calculation unit. In particular, the defect detection circuitry 136 may be implemented in the form of a separate integrated circuit. This makes it possible that even if a central microcontroller of the calculation unit 104 is defect, it is still possible to connect the two neighboring calculation units with one another. Thereby, this connection particularly includes a data communication and a power connection.

This defect detection circuitry 136 makes it possible that an additional safety against hardware failures is obtained. As soon as a defect is detected, the respective calculation unit is skipped so that at least part of the functionality of the cable channel can be maintained.

The RFID reader circuitry 138 may particularly correspond to the circuitry necessary for detecting a passing RFID transponder. In particular, the calculation unit may thereby correspond to an RFID reader. The signals obtained via the antenna are evaluated to determine whether a passive RFID-tag corresponding to the sports timing transponder has passed. If one passing passive RFID-tag is detected, a corresponding passing time is determined. In particular, it is still thereby possible that a received signal strength (RSS) is evaluated. Alternatively/additionally, however, it is possible that a phase change of a signal is evaluated.

Figure 13:
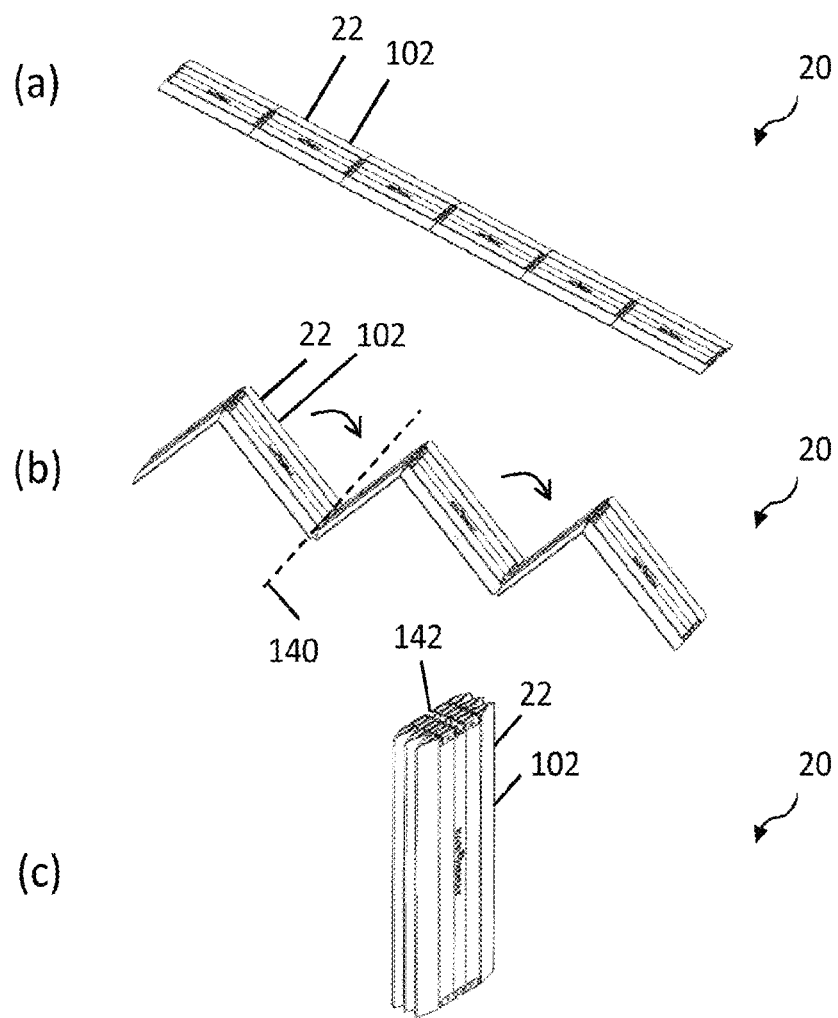
FIG. 13 shows a schematic illustration of a floor cable channel of the present invention being brought from an operating position (a) via an intermediate position (b) into a transport position (c)

In FIG. 13 an embodiment of a floor cable channel 20 of the present invention is schematically illustrated. The illustrated floor cable channel 20 includes six detection assemblies 102 that are connected to one another to form a line. In FIG. 13 (a) the floor cable channel 20 is in an operating position in which the different channel elements 22 are arranged one behind the other along their longitudinal axis. FIG. 13 (b) schematically illustrates that by means of a rotational movement of the neighboring channel elements 22 versus one another in the direction of the illustrated arrows the floor cable channel 20 can be brought into a transport position, as illustrated in FIG. 13 (c). One of the rotational axes 140 is schematically illustrated in FIG. 13 (b). In the transport position illustrated in FIG. 13 (c) the channel elements 22 of the floor cable channel 20 are arranged parallel to each other.

By bringing the floor cable channel 20 from the transport position into the operating position an easy set-up of the race timing system of the present invention becomes possible. For instance, if multiple floor cable channels 20 have to be installed on site at a sports event, the set-up is facilitated by making it possible that the different floor cable channels 20 are transported to their respective positions in the transport position and deployed by means of the illustrated rotational movement.

In order to provide this rotation functionality, the different channel elements 22 of the floor cable channel 20 are connected to their neighboring channel elements by means of connection elements 142. These connection elements 142 can be joint-like. For instance, a hook or double hook representing a connection element 142 can be clamped into corresponding receptacles in neighboring channel elements 22.

Figure 14:
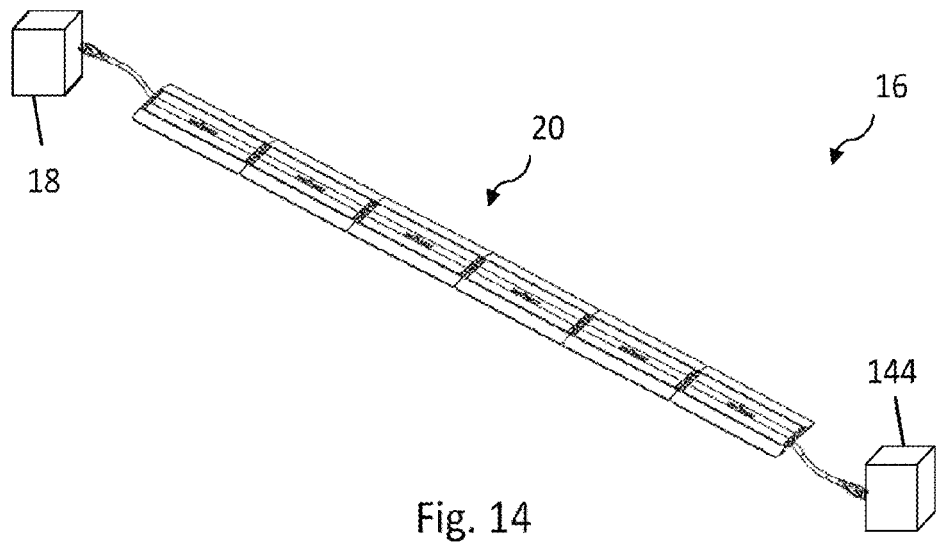
FIG. 14 shows a schematic illustration of a race timing system including two decoders connected to two sides of a floor cable channel.

In FIG. 14 another embodiment of a race timing system 16 of the present invention is schematically illustrated. The race timing system 16 includes a floor cable channel 20 that is connected to a decoder 18 and a further decoder 144. The two decoders 18, 144 are arranged on two different sides of the floor cable channel 20. On the one hand, such a set-up can provide for redundancy if one of the two decoders 18, 144 fails. On the other hand, it is also possible that two separate chains of calculation units as illustrated in FIG. 11 are independently connected to separate decoders 18, 144.

Figure 15:
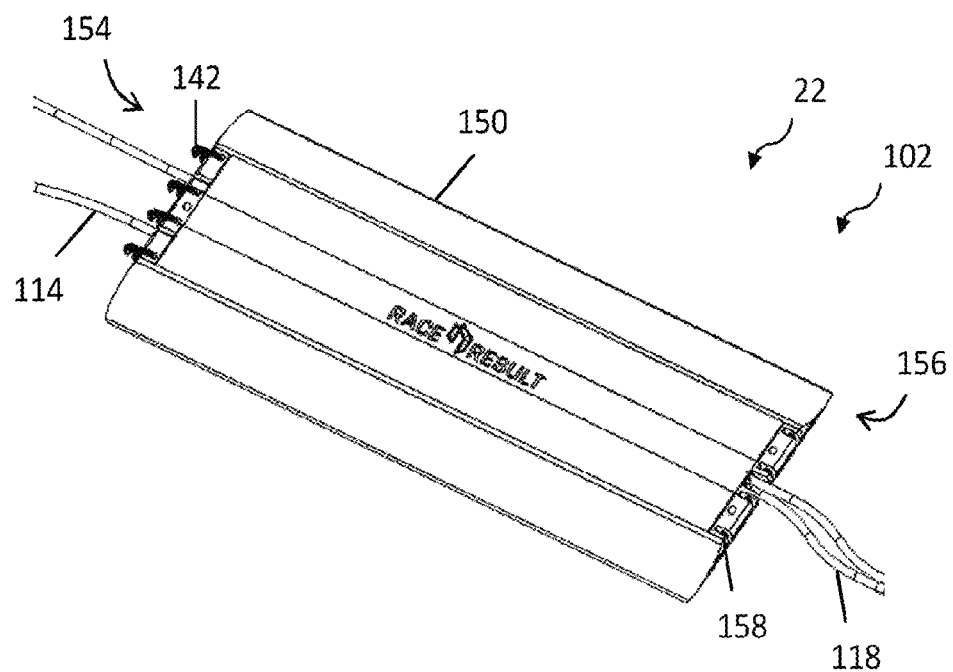
FIG. 15 shows a schematic illustration of a detection assembly according to an aspect of the present invention.
Figure 16:
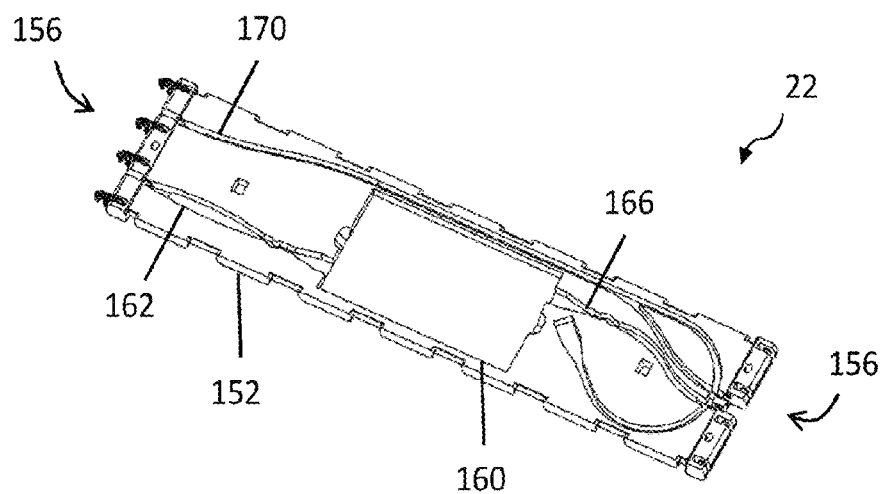
FIG. 16 shows a schematic illustration of a channel element according to an aspect of the present invention.
Figure 17:
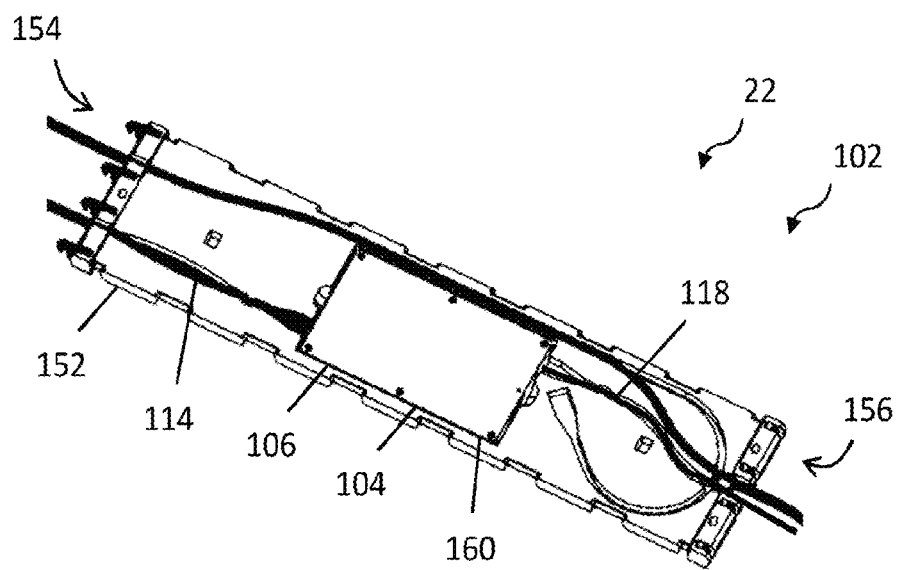
FIG. 17 shows a schematic illustration of a channel element including an antenna as well as a first cable, a second cable and a cable in a bypass protection area.

In FIGS. 15 to 17 an embodiment of a detection assembly 102 including a channel element 22, an antenna 106 and a calculation unit 104 is illustrated. The channel element 22 includes a top portion 150 and a bottom portion 152 connectable to the top portion 150. FIG. 15 illustrates the detection assembly 102 with the top portion 150 covering the bottom portion 152 in which the antenna 106 and the calculation unit 104 are housed. FIG. 16 shows the bottom portion 152 of the channel element 22 without the antenna 106, the calculation unit 104 and the connecting cables. FIG. 17 shows the bottom portion 152 with the antenna 106, the calculation unit 104 and the corresponding cables therein. The connection between the top portion 150 and the bottom portion 152 can be implemented in the form of a snapping or clicking mechanism.

The antenna 106 and the calculation unit 104 may be arranged on two printed circuit boards being stacked with a spacer layer between. Thereby, the spacer layer can particularly be implemented in the form of a polystyrene layer. The antenna 106 can particularly be implemented in the form of a patch antenna. By making use of the polystyrene layer in between the calculation unit 104 and the antenna 106 it becomes possible to obtain a suitable directional characteristic of the antenna 106 in the desired direction (in particular upward when the detection assembly is placed on the ground in order to detect sports timing transponders of participants in a sports event).

Referring to FIGS. 15 to 17 the channel element 22 includes a first connection portion 154 for connecting the channel element 22 to a preceding channel element and a second connection portion 156 for connecting the channel element 22 to a following channel element. As illustrated and as also explained above, the connection can thereby, e.g., be implemented in the form of one or multiple connection elements 142 that are designed to clamp to corresponding protrusions 158.

The channel element 22 includes a center protection area 160 in which the antenna 106 is received. Further, the channel element 22 includes a first protection area 162 for receiving a first cable 114 and a second protection area 166 for receiving a second cable 118. Thereby, the first protection area 162 connects the center protection area 160 to the first connection portion 154, i.e. the connection portion connecting the channel element to a preceding channel element. Thus, a cable can be guided from the center protection area 160 to the first connection portion 154. The second protection area 166 connects the center protection area 160 to the second connection portion 156. In addition, the channel element 22 includes a bypass protection area 170 that connects the first connection portion 154 to the second connection portion 156. In this respect the term connect means that respective protection area is designed to house and protect a respective connection cable.

In the illustrated embodiment, the center protection area 160, the first protection area 162 and the second protection area 166 correspond to cavities formed between the top portion 150 and the bottom portion 152. In particular, the cavities are formed out in the bottom portion 152 and are covered by flat segments of the top portion 150.

The channel element 22 of the present invention thereby makes it possible that in a line of multiple channel elements that are connected at their respective connection portions, the calculation units in every second channel element are connected to one another (for data and power transfer). Thus, the second cable 118 of one detection assembly connects the calculation unit of this detection assembly to a calculation unit in a channel element that follows the following channel element. The second cable 118 is thereby guided through the bypass protection area 170 of the following channel element.

Figure 18:
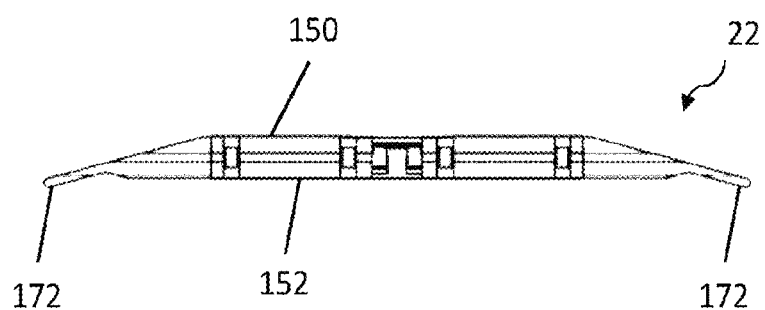
FIG. 18 shows a schematic illustration of a sectional view of a channel element.

FIG. 18 schematically illustrates a sectional view of a channel element of the present invention. As illustrated, the top portion 150 overlaps the bottom portion 152 in a direction orthogonal to a longitudinal axis of the channel element (right-left-direction in FIG. 18). In the illustrated embodiment, the overlap thereby corresponds to flexible protrusion portions 172 on both sides of the top portion 150. These flexible protrusion portions 172 are designed to accommodate unevenness of the underlying surface. The flexible protrusion portions 172 thereby extend along the longitudinal axis of the channel element so that over the entire length of the channel element the top portion can provide for a direct contact of the channel element 22 with the underlying surface.

Figure 19:
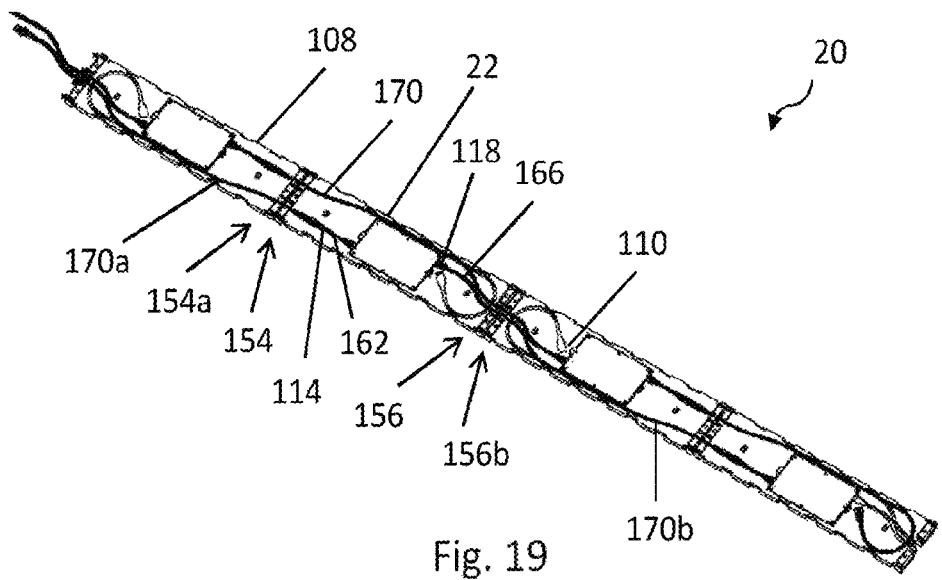
FIG. 19 shows a schematic illustration of four channel elements.

In FIG. 19 an embodiment of a floor cable channel 20 comprising four detection assemblies and four channel elements is illustrated. The following description and explanation is to be understood from the perspective of the second channel element 22 or detection assembly 102 from the left side but can be transferred to others in the line and to longer/shorter floor cable channels.

The channel element 22 is connected at its first connection portion 154 to a preceding channel element 108 and, at its second connection portion 156, to a following channel element 110. In the illustrated embodiment, the preceding first connection portion 154a of the preceding channel element 108 is connected to the first connection portion 154 of the channel element 22. The following second connection portion 156b is connected to the second connection portion 156 of the channel element 22. The first cable 114 runs from the first protection area 162 to the preceding bypass protection area 170a of the preceding channel element 108. The second cable 118 in the second protection area 166 is guided to the following bypass protection area 170b in the following channel element 110. Consequently and as explained above, the calculation units in every second detection assembly are connected. In the illustrated example, the calculation unit in the preceding channel element 108 is connected to the calculation unit in the following channel element 110 by means of a cable running through the bypass protection area 170 of the channel element 22.

As illustrated in FIG. 19, the cable outlets of the first protection area 162 and the bypass protection area 170 at the first connection portion 154 are (optionally) arranged at a different distance from one another than the cable outlets of the second protection area 166 and the bypass protection area 170 at the second connection portion 156. Thereby, the first connection portion 154 can only be connected to a preceding first connection portion 154a of the preceding channel element 108. This construction makes it possible to avoid a crossing of the cables, which again results in an additional increase in robustness.

Figure 20:
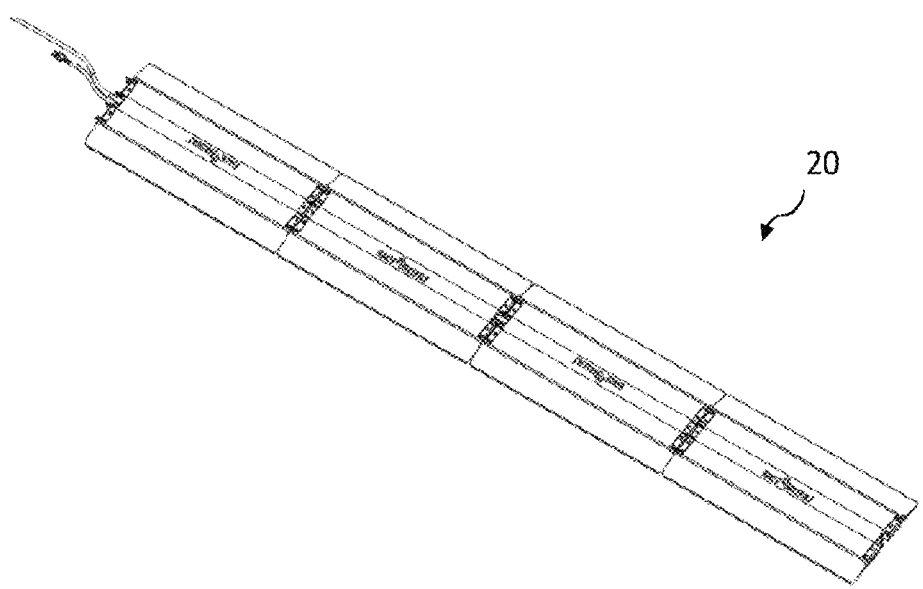
FIG. 20 shows a schematic illustration of four detection assemblies.
Figure 21:
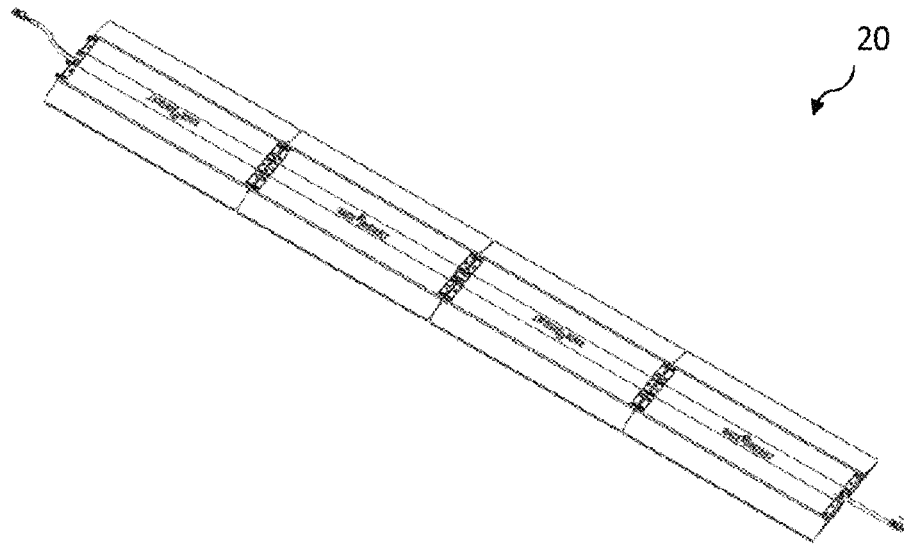
FIG. 21 shows a schematic illustration of another embodiment of a floor cable channel including four detection assemblies.

As illustrated in FIGS. 20 and 21, it is thereby possible that either both chains of calculation units are connected on one side of the cable channel (left side in FIG. 20) or that the different chains are connected on two sides of the floor cable channel 20 (FIG. 21).

Figure 22:
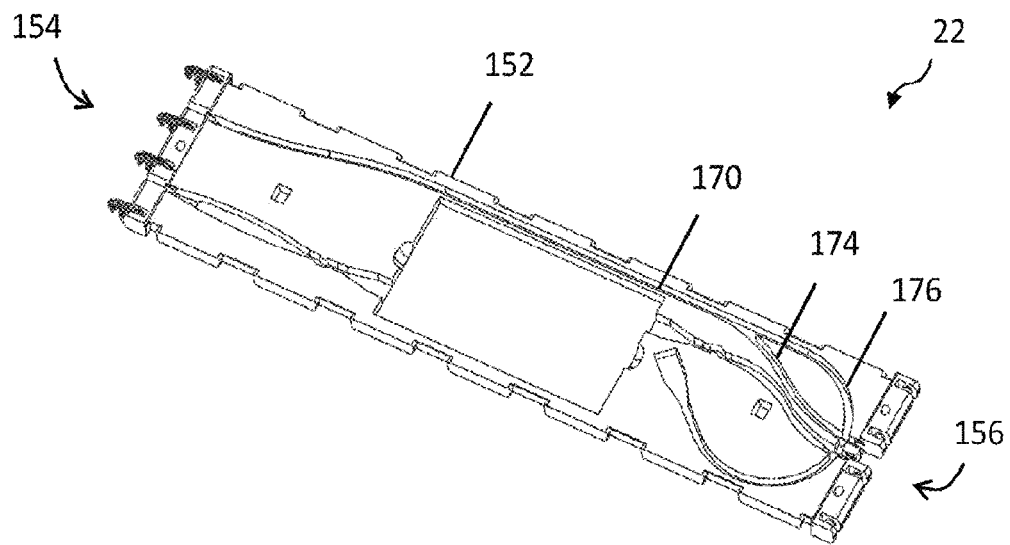
FIG. 22 shows a schematic illustration of a channel element.

In FIG. 22 the bottom portion 152 of a channel element 22 is schematically illustrated. In the example, the bypass protection area 170 is designed to include a relay portion 174 in addition to a terminal portion 176. Thereby, the relay portion 174 is designed to connect the first connection portion 154 to the second connection portion 156, i.e. to guide a cable through the entire channel element 22 between two corresponding cable outlets. On the other hand, the terminal portion 176 is designed to store an end section of a cable in the bypass protection area 170. A cable in the bypass protection area can alternatively be placed in the terminal portion 176 or in the relay portion 174. Thus, an overlap of the cable can be prevented in case the channel element 22 represents the last channel element in a floor cable channel. In the bypass protection area 170 a cable originating from a preceding channel element can be housed and protected from environmental impacts. In order to prevent an overlap of this cable out of the channel element 22, the cable can be stored in the terminal portion 176 (by a user) if no further channel elements are to be connected.

Figure 23:
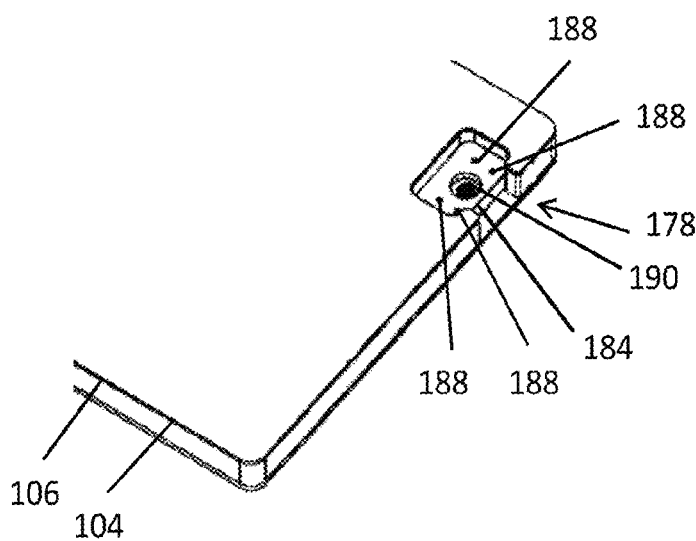
FIG. 23 shows a schematic illustration of an assembly of a calculation unit and an antenna including a first connector part for connecting to a cable.
Figure 24:
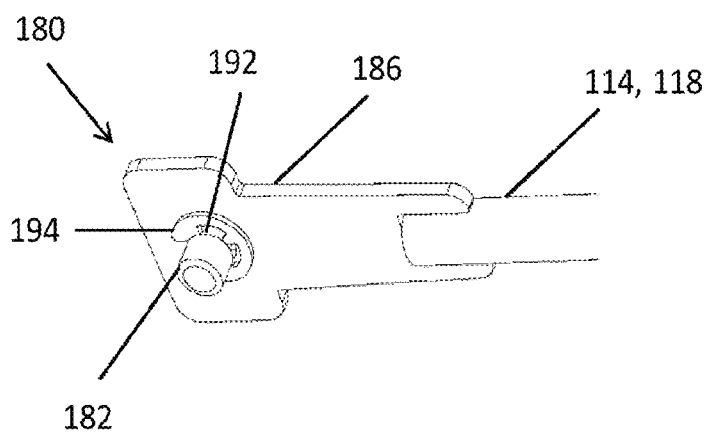
FIG. 24 shows a schematic illustration of a second connector part located at a cable.
Figure 25:
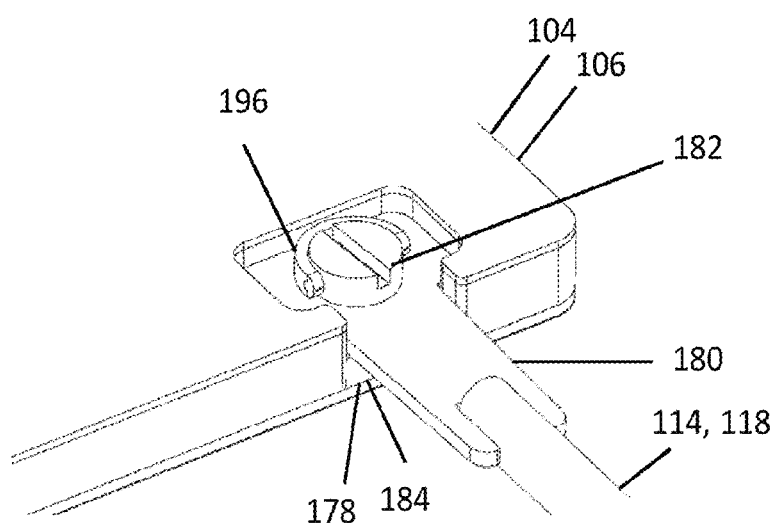
FIG. 25 shows a schematic illustration of first connector part being in connection with a second connector part to establish an electric connection.

In FIGS. 23, 24 and 25 a preferred embodiment of a connection between a cable 114, 118 (first cable or second cable, respectively) and a calculation unit 104 is schematically illustrated. The calculation unit 104 is connectable to the first cable 114 and/or the second cable 118 by means of a first connector part 178 and a second connector part 180 that are designed for being screwed together by means of a screw 182 to establish an electric connection (and a robust mechanical connection). In the illustrated embodiment, the electric connection has four conductors. It is, however, also possible to use different number of conductors. FIG. 23 particularly shows the first connector part 178, FIG. 24 particularly shows the second connector part 180 and FIG. 25 particularly shows the two connector parts 178, 180 being screwed together by means of the screw 182.

In comparison to previous approaches relying on plug-and-socket connections the use of the screw 182 for connecting the first connector part 178 and the second connector part 180 allows for a robust connection that provides mechanical stability in a comparably small construction space. Further, an efficient manufacturing becomes possible. It is to be understood that the connection principle including the first connector part 178 and the second connector part 180 can also be used independently of the design of the channel element 22 as illustrated in the other figures and as described herein and/or in other application areas.

As illustrated, the antenna 106 and the calculation unit 104 can be integrated in an assembly and, e.g., be arranged on a common printed circuit board. For mechanical protection this assembly can be hosted within a casing or the like. The connection of the calculation unit 104 (and the antenna 106) to the first cable 114 and/or the second cable 118 can be established via a first connector part 178 on the side of the calculation unit 104. As illustrated, this first connector part 178 can include a printed circuit board 184. In particular, this printed circuit board 184 can accommodate the calculation unit 104. In the illustrated embodiment the first connector part 178 includes four pogo pins 188 for establishing the electric connection when the second connector part 180 is screwed to the first connector part 178. The pogo pins 188 are spring-loaded pins for establishing an electric connection and providing a durable and resilient electric connection.

In the illustrated embodiment the second connector part 180 also includes a printed circuit board 186 having a hole 192 for the screw 182. As illustrated, the screw is (optionally) fixed by means of a clip 194 to prevent a loss of the screw 182, when the second connector part 180 is not in connection with the first connector part. The first connector part 178 can include a threaded connector 190 that is designed for receiving the screw 182.

The two connector parts 178, 180 are screwed together by means of a screw 182. In the illustrated embodiment the screw is configured for manual operation by without a screw driver by means of a hinged clamp 196 attached to the screw 182.

Between the two connector parts 178, 180 a sealing (not illustrated) can be arranged to protect the actual conductors from moisture. It is possible to design at least one of the two connector parts 178, 180 to hold this sealing in place, also while not being connected. Herein, the different circuitries are in particular described with respect to their function. This functionality can be obtained by soft- and/or hardware.

For instance, it is possible that the respective functionality is partly or completely implemented in a software running on a microcontroller. Thus, each calculation unit may include a microcontroller implementing the respective functions either alone or in communication and interaction with further passive or active electrical components such as resistors, capacitors and inductors.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the description is intended to be illustrative, but not limiting the scope of the disclosure, as well as other claims. The disclosure, including any readily discernible variants of the teachings herein, defines, in part, the scope of the foregoing claim terminology such that no inventive subject-matter is dedicated to the public.

In the claims, the word "comprising" does not exclude other elements or steps, and the indefinite article "a" or "an" does not exclude a plurality. A single element or unit may fulfill the functions of several items recited in the claims. The mere fact that certain measures are recited in mutually different dependent claims does not indicate that a combination of these measures cannot be used to advantage.

The elements and units of the disclosed apparatuses, devices, circuitry and system may be implemented by corresponding hardware and/or software elements, for instance appropriated circuits. A circuit is a structural assemblage of electronic components including conventional circuit elements, integrated circuits including application-specific integrated circuits, standard integrated circuits, application-specific standard products, and field programmable gate arrays. Further a circuit includes central processing units, graphics processing units, and microprocessors which are programmed or configured according to software code. A circuit does not include pure software, although a circuit includes the above-described hardware executing software.

The invention claimed is:

1. A detection assembly for detecting passing sports timing transponders in a sports event, comprising an antenna and a calculation unit being positioned in a center protection area of a channel element, and a channel element for a floor cable channel for positioning the antenna on an underlying surface and for protecting the antenna from external forces, the channel element comprising:
   a first connection portion for connecting the channel element to a preceding channel element and a second connection portion for connecting the channel element to a following channel element;
   a center protection area for receiving the antenna and the calculation unit;
   a first protection area for receiving a first cable, wherein the first protection area is designed to connect the center protection area to the first connection portion, and a second protection area for receiving a second cable, wherein the second protection area is designed to connect the center protection area to the second connection portion; and
   a bypass protection area for receiving a cable, wherein the bypass protection area is designed to connect the first connection portion to the second connection portion, wherein
   the first connection portion is designed to connect the first protection area to a bypass protection area of the preceding channel element and the bypass protection area to a first protection area of the preceding channel element; or the second connection portion is designed to connect the second protection area to a bypass protection area of the following channel element and the bypass protection area to a second protection area of the following channel element;

said calculation unit is connectable to a first neighboring calculation unit in a pre-preceding channel element via a first cable positioned in the first protection area and also positioned in a bypass protection area of the preceding channel element; and said calculation unit is connectable to a second neighboring calculation unit in a post-following channel element via a second cable positioned in the second protection area and also positioned in a bypass protection area of the following channel element.

2. The detection assembly as claimed in claim 1 wherein the channel element includes a top portion and a bottom portion connectable to the top portion, wherein the center protection area, the first protection area, the second protection area and the bypass protection area correspond to cavities formed between the top portion and the bottom portion upon connection.

3. The detection assembly as claimed in claim 2, wherein the top portion is designed to overlap the bottom portion in a direction orthogonal to a longitudinal axis of the channel element; or includes a flexible protrusion portion for accommodating an unevenness of the underlying surface.

4. The detection assembly as claimed in claim 1, wherein cable outlets at the first connection portion are arranged at a different distance than cable outlets at the second connection portion so that the first connection portion connects to a preceding first connection portion of the preceding channel element and the second connection portion connects to a following second connection portion of the following channel element.

5. The detection assembly as claimed in claim 1, wherein the bypass protection area includes a relay portion and a terminal portion in the area of the second connection portion;

the relay portion is designed to connect the first connection portion to the second connection portion; and the terminal portion is designed to store an end section of a cable in the bypass protection area in case no following channel element is connected to prevent an overlap of the end section out of the channel element.

6. The detection assembly as claimed in claim 1, wherein the calculation unit includes RFID reader circuitry for detecting passing passive sports timing transponders in spatial vicinity of the antenna and determine a corresponding passing time.

7. The detection assembly as claimed in claim 1, wherein the calculation unit and the antenna are arranged on two printed circuit boards being stacked with a spacer layer in between, in particular a polystyrene layer.

8. The detection assembly as claimed in claim 1, wherein said calculation unit includes a voltage detection circuitry for detecting whether power is provided to the calculation unit via the first cable or via the second cable.

9. The detection assembly as claimed in claim 1, wherein the calculation unit includes a data bus circuitry to provide a data bus communication with further calculation units of further detection assemblies connected via the first cable and via the second cable in a daisy chain.

10. The detection assembly as claimed in claim 1, wherein the calculation unit includes at least one of a terminal detection circuitry for detecting whether the calculation unit is connected to only one of the first neighboring calculation unit and the second neighboring communication unit;

a position detection circuitry for detecting a first number of calculation units connected via the first cable or a second number of calculation units connected via the second cable; and a reconfiguration circuitry for detecting a change in a first number of calculation units connected via the first cable or a second number of calculation units connected via the second cable.

11. The detection assembly as claimed in claim 1, wherein the calculation unit is connectable to the first cable or the second cable by means of a first connector part and a second connector part that are designed for being screwed together to establish an electric connection.

12. The detection assembly as claimed in claim 11, wherein the first connector part and the second connector part include printed circuit boards; or include at least one pogo pin for establishing the electric connection upon being screwed together.

13. The detection assembly as claimed in claim 12, wherein the first connector part includes a threaded connector for receiving a screw, in particular a soldered threaded connector.

14. The detection assembly as claimed in claim 12, wherein the first connector part or the second connector part are designed for holding a sealing in between for protecting the electric connection from moisture.

15. A floor cable channel comprising multiple detection assemblies connected to one another to form a line, each detection assembly for detecting passing sports timing transponders in a sports event and comprising an antenna and a calculation unit being positioned in a center protection area of a channel element, and a channel element for a floor cable channel for positioning the antenna on an underlying surface and for protecting the antenna from external forces, the channel element comprising:

a first connection portion for connecting the channel element to a preceding channel element and a second connection portion for connecting the channel element to a following channel element;

a center protection area for receiving the antenna and the calculation unit;

a first protection area for receiving a first cable, wherein the first protection area is designed to connect the center protection area to the first connection portion, and a second protection area for receiving a second cable, wherein the second protection area is designed to connect the center protection area to the second connection portion; and a bypass protection area for receiving a cable, wherein the bypass protection area is designed to connect the first connection portion to the second connection portion, wherein the first connection portion is designed to connect the first protection area to a bypass protection area of the preceding channel element and the bypass protection area to a first protection area of the preceding channel element; or the second connection portion is designed to connect the second protection area to a bypass protection area of the following channel element and the bypass protection area to a second protection area of the following channel element;

said calculation unit is connectable to a first neighboring calculation unit in a pre-preceding channel element via a first cable positioned in the first protection area and also positioned in a bypass protection area of the preceding channel element; and said calculation unit is connectable to a second neighboring calculation unit in a post-following channel element via a second cable positioned in the second protection area and also positioned in a bypass protection area of the following channel element, wherein the calculation units in every second detection assembly are connected via cables so that two independently connected chains are formed.

16. The floor cable channel as claimed in claim 15, wherein a connection portion of a first channel element is designed for being connected to a connection portion of a second channel element by means of a connection element allowing a rotational movement of the first channel element relative to the second channel element about a rotational axis orthogonal to a first longitudinal axis of the first channel element and orthogonal to a second longitudinal axis of the second channel element; and by means of said rotational movement, the floor cable channel is brought into a transport position in which the channel elements are parallel to each other and into an operating position in which the channel elements are arranged one behind the other along their longitudinal axes.

17. A race timing system including a floor cable channel, the floor cable channel comprising multiple detection assemblies connected to one another to form a line, each detection assembly for detecting passing sports timing transponders in a sports event and comprising an antenna and a calculation unit being positioned in a center protection area of a channel element, and a channel element for a floor cable channel for positioning the antenna on an underlying surface and for protecting the antenna from external forces, the channel element comprising:

a first connection portion for connecting the channel element to a preceding channel element and a second connection portion for connecting the channel element to a following channel element;

a center protection area for receiving the antenna and the calculation unit;

a first protection area for receiving a first cable, wherein the first protection area is designed to connect the center protection area to the first connection portion, and a second protection area for receiving a second cable, wherein the second protection area is designed to connect the center protection area to the second connection portion; and a bypass protection area for receiving a cable, wherein the bypass protection area is designed to connect the first connection portion to the second connection portion, wherein the first connection portion is designed to connect the first protection area to a bypass protection area of the preceding channel element and the bypass protection area to a first protection area of the preceding channel element; or the second connection portion is designed to connect the second protection area to a bypass protection area of the following channel element and the bypass protection area to a second protection area of the following channel element;

said calculation unit is connectable to a first neighboring calculation unit in a pre-preceding channel element via a first cable positioned in the first protection area and also positioned in a bypass protection area of the preceding channel element; and said calculation unit is connectable to a second neighboring calculation unit in a post-following channel element via a second cable positioned in the second protection area and also positioned in a bypass protection area of the following channel element;

the race timing system including a decoder connected to a calculation unit of the first or second detection assembly in the line, wherein the decoder is configured to synchronize operation of the connected detection assemblies.

18. The race timing system as claimed in claim 17, including a further decoder connected to a calculation unit of the last or before-last detection assembly.

* * * * *